United States Patent [19]

Ezawa

[11] Patent Number: 5,706,272
[45] Date of Patent: Jan. 6, 1998

[54] OPTICAL SYSTEM DRIVING MECHANISM FOR AN OPTICAL SYSTEM DRIVING APPARATUS AND A SLIDING MOVEMENT STABILIZING MECHANISM THEREOF

[75] Inventor: Hiroshi Ezawa, Sagamihara, Japan

[73] Assignee: Olympus Optical Co., Ltd., Tokyo, Japan

[21] Appl. No.: 273,221

[22] Filed: Jul. 11, 1994

[30] Foreign Application Priority Data

Jul. 12, 1993 [JP] Japan .................................. 5-171465
Aug. 30, 1993 [JP] Japan .................................. 5-214105

[51] Int. Cl.$^6$ .............................. G11B 17/00; G11B 19/22; G11B 7/00; G07B 7/02
[52] U.S. Cl. ................... 369/249; 369/44.16; 369/44.15; 359/813; 359/814; 359/823; 359/824
[58] Field of Search .................................. 369/249, 44.14, 369/44.15, 44.16, 215; 359/813, 814, 823, 824; 250/239, 201.5

[56] References Cited

U.S. PATENT DOCUMENTS

| 5,128,806 | 7/1992 | Ohno ..................... 369/44.15 |
| 5,130,972 | 7/1992 | Mizuno et al. ............. 369/215 |
| 5,313,334 | 5/1994 | Tomiyama et al. ......... 359/824 |

FOREIGN PATENT DOCUMENTS

| 59-71471 | 5/1984 | Japan . |
| 60-35322 | 3/1985 | Japan . |
| 61-40771 | 3/1986 | Japan . |
| 3-5971 | 1/1991 | Japan . |
| 4-149829 | 5/1992 | Japan . |
| 4-62133 | 10/1992 | Japan . |

*Primary Examiner*—Stuart S. Levy
*Assistant Examiner*—Adriana Giordana
*Attorney, Agent, or Firm*—Frishauf, Holtz, Goodman, Langer & Chick

[57] ABSTRACT

An optical system driving apparatus includes a holding member holding an optical element and having first and second surfaces facing in opposite directions, and a carriage having first and second surfaces which contact the surfaces of the holding member and slidably clamp the surfaces of the holding member. At least one of a slidable contact surface portion of the first surface of the holding member which corresponds to the first surface of the carriage and a slidable contact surface portion of the first surface of the carriage which corresponds to the first surface of the holding member is formed into an at least partly spherical shape having a center coinciding with an optical center of the optical element, and the other portion guides the holding member to move in a circumferential direction of the spherical slidable contact surface portion. Further, at least one of a slidable contact surface portion of the second surface of the holding member which corresponds to the second surface of the carriage and a slidable contact surface portion of the second surface of the carriage which corresponds to the second surface of the holding member is formed into an at least partly spherical shape having a center coinciding with the optical center, and the other portion guides the holding member to move in a circumferential direction of the spherical slidable contact surface portion.

13 Claims, 21 Drawing Sheets

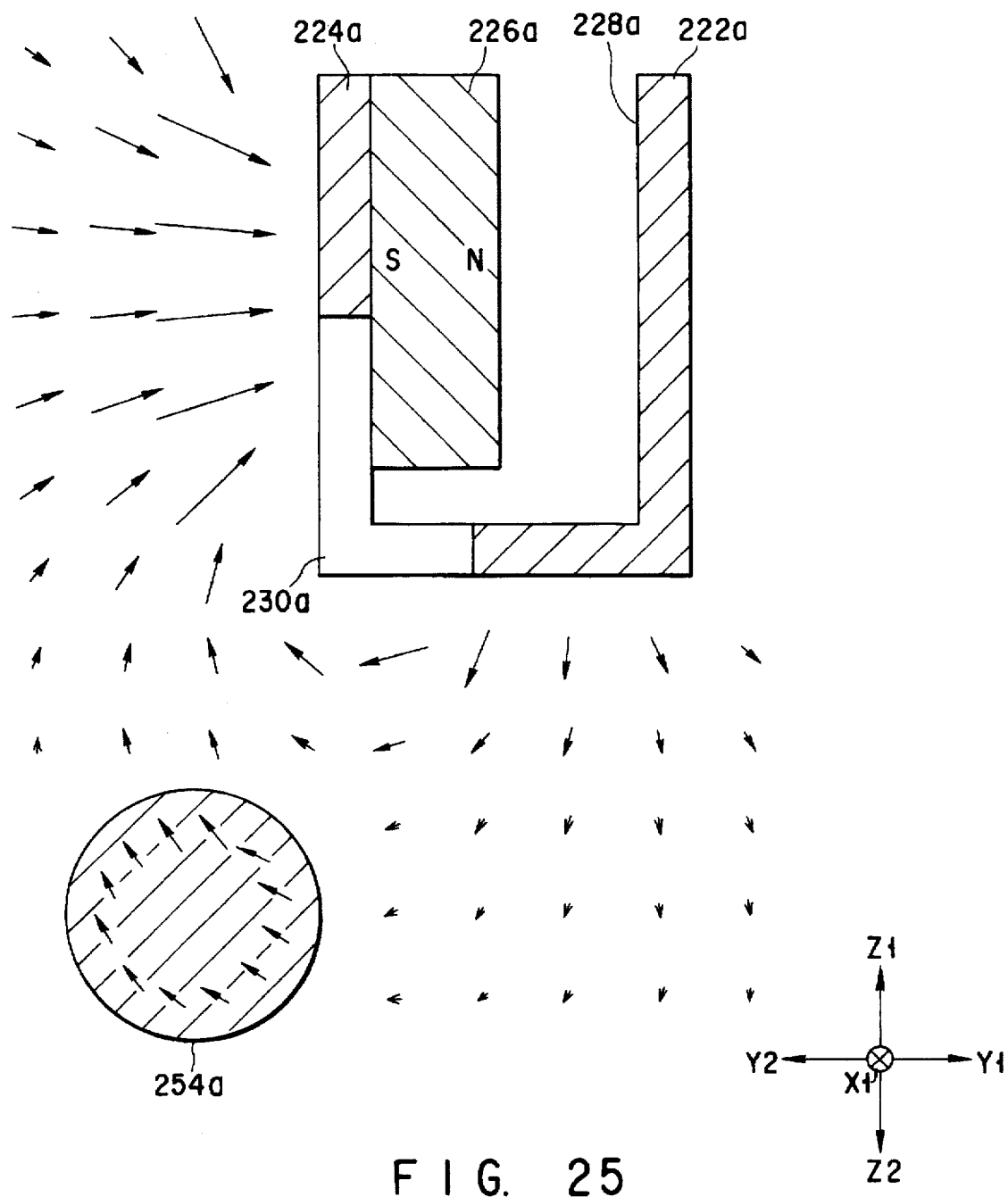
F I G. 25

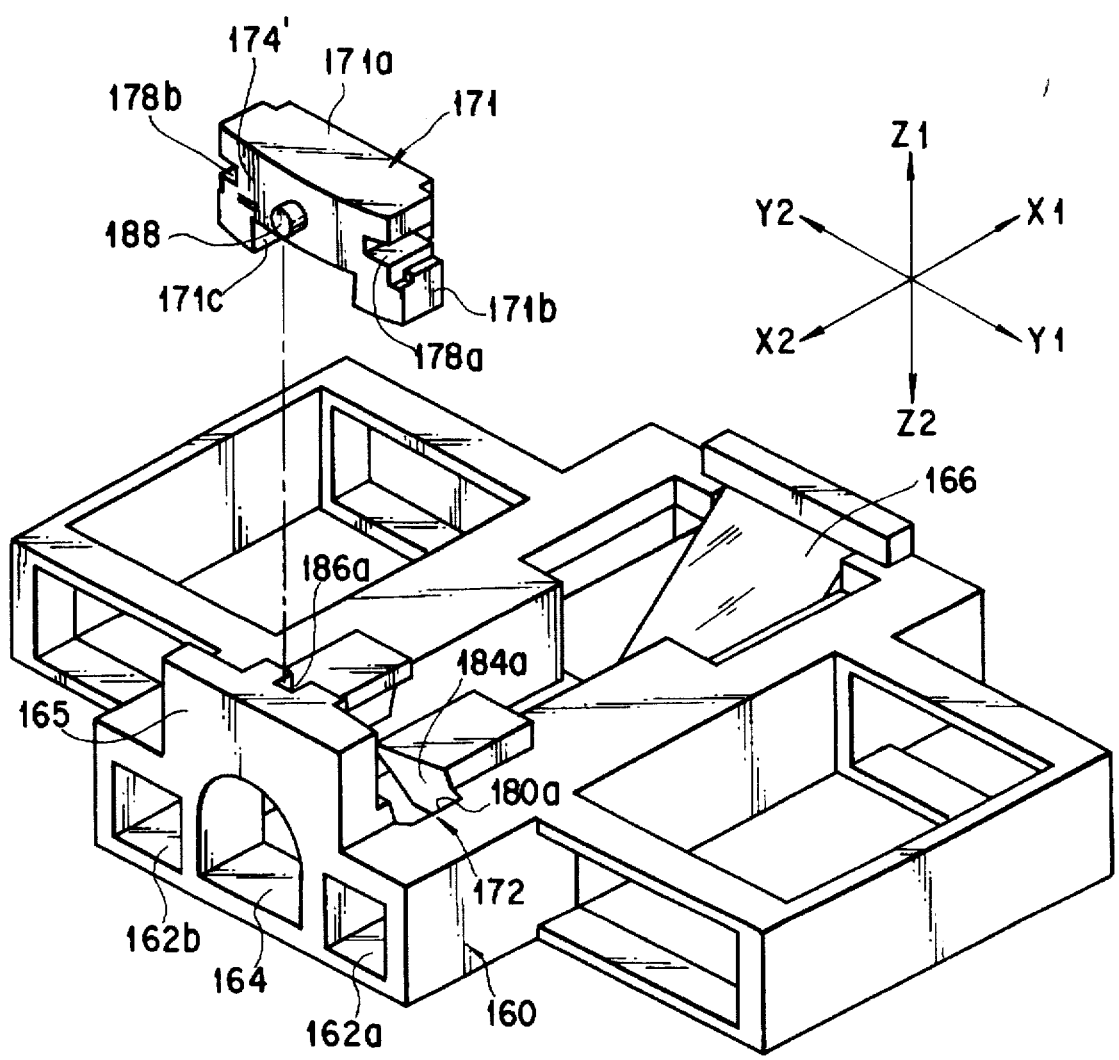
F I G. 31

OPTICAL SYSTEM DRIVING MECHANISM FOR AN OPTICAL SYSTEM DRIVING APPARATUS AND A SLIDING MOVEMENT STABILIZING MECHANISM THEREOF

BACKGROUND OF THE INVENTION

1. Field of the Invention

The present invention relates to an optical system driving apparatus for an information recording/reproducing apparatus for optically recording and/or reproducing information on/from a disk-like information recording medium.

2. Description of the Related Art

An optical system driving apparatus of the above type is designed to support an optical element used for the above optical recording and/or reproduction of information. The apparatus moves in a radial direction of a disk-like information recording medium to make the optical element access a desired track of the recording medium while the recording medium is rotated in a predetermined direction at a predetermined speed, and moves the optical element in a direction almost perpendicular to a flat surface of the disk-like information recording medium to make the optical element optically focus on the desired track.

In order to improve precision in the above optical recording and/or reproduction of information, the width of a beam spot, formed by using a laser beam and projected on the desired track of the disk-like information recording medium via the optical element, needs to be minimized. For this purpose, an optical axis of an objective lens included in the optical element must be set to be perpendicular to an information recording surface included in the disk-like information recording medium and being parallel to the flat surface.

In a production line of the optical information recording/reproducing apparatus, the above described adjustment of the optical axis is inevitably required because of dimensional tolerances of various components, and various mechanisms for the above adjustment are used.

FIG. 1 schematically shows an exploded perspective view of a mechanism for the above-mentioned adjustment, which is disclosed in Japanese Patent Application KOKOKU Publication No. 4-62133. FIG. 2 schematically shows a cross-sectional view of the mechanism in FIG. 1.

As shown in FIGS. 1 and 2, in the conventional mechanism, a light passage hole 34 is formed in an objective lens supporting block 32, and an objective lens 30 is supported in the hole 34. A peripheral region of an end opening of the hole 34, located on a bottom surface of the block 32 and around an optical axis LA of the objective lens 30, is formed into a convex spherical surface 36 whose center coincides with a center 30a of the objective lens 30. The objective lens supporting block 32 is seated on a seat portion formed on an upper surface of an optical axis adjustment block 38. The adjustment block 38 is designed to support the objective lens supporting block 32 such that the inclination angle of the optical axis LA of the objective lens 30 in a desired direction can be adjusted. The seat portion on the upper surface of the optical axis adjustment block 38 is formed as a concave spherical surface 40 conforming to the convex spherical surface 36 of the objective lens supporting block 32. A light passage hole 42 corresponding to the light passage hole 34 of the objective lens supporting block 32 is formed in a center of the concave spherical surface 40.

Screw holes 44a, 44b, 44c, and 44d, a diameter of each of which is increased in its inner portion, are formed in the bottom surface of the objective lens supporting block 32 at four positions around the spherical surface 36 at equal angular intervals in the circumferential direction of the spherical surface 36. Adjustment screws 52a, 52b, 52c, and 52d respectively having compression coil springs 50a, 50b, 50c, and 50d fitted thereon pass through holes 46a, 46b, 46c, and 46d formed in the optical axis adjustment block 38 at four positions around the spherical surface 40 at equal angular intervals in the circumferential direction of the spherical surface 40. Distal end portions of the adjustment screws 52a, 52b, 52c, and 52d are threadably engaged with the screw holes 44a, 44b, 44c, and 44d.

In the conventional optical axis adjustment mechanism having this arrangement, an inclination angle of the optical axis LA of the objective lens 30 in the objective lens supporting block 32 can be adjusted to a desired angle in a desired direction by adjusting screwing amounts of the four adjustment screws 52a, 52b, 52c, and 52d.

In a well-known conventional mechanism for the above adjustment, which is disclosed in Japanese Utility Model Application KOKAI Publication No. 60-35322, a partly annular circumferential surface whose center coincides with a center of an objective lens included in an optical element is formed on an objective lens supporting block, and the objective lens supporting block can be inclined only in an extending direction of the circumferential surface.

In the former conventional optical axis adjustment mechanism using, the compression coil springs 50a, 50b, 50c, and 50d and the adjustment screws 52a, 52b, 52c, and 52d, the number of components and weight of the mechanism are large. In addition, a space required to form the through holes 46a, 46b, 46c, and 46d for containing these screws and springs makes an outer size of the optical axis adjustment block 38 become large.

A reduction in size of an optical information recording/reproducing apparatus is constantly required. For this requirement, it is preferable that a size of an optical system driving apparatus be minimized. However, an optical system driving apparatus having the former conventional optical axis adjustment mechanism is large in its outer size and weight. Furthermore, a reduction in weight of the optical system driving apparatus is important to increase the moving speed of the optical system driving apparatus and to improve resonance characteristics of the apparatus.

The outer size and weight of the later conventional optical axis adjustment mechanism is smaller than those of the former conventional optical axis adjustment mechanism. However, the latter mechanism can adjust the inclination angle of the optical axis of the objective lens only in a predetermined direction.

In addition, the conventional optical system driving apparatus is slidably supported on a plurality of guide rails extending in a radial direction of the disk-like information recording medium and is moved in the radial direction. A small gap is inevitably formed between each guide rail and the optical system driving apparatus to make the sliding movement of the apparatus smooth and allow dimensional tolerances in the manufacture of the apparatus. The above-mentioned gaps normally cause no rattling because the optical system driving apparatus is pressed on the guide rails with its own weight. However, when vibrations are externally applied to the optical system driving apparatus, or something comes into contact with the optical system driving apparatus while the apparatus is sliding along the guide rails, the optical system driving apparatus is quickly moved (due to the existence of the above gaps) to collide with the guide rails. As a result of this, it is not rare that at least the optical system driving apparatus or the guide rails is damaged.

In order to minimize the size and weight of the optical system driving apparatus as described above, members having relatively large weights, e.g., a light-emitting means and a light-receiving means, are spaced apart from the optical system driving apparatus and are fixed to a fixing frame of the optical information recording/reproducing apparatus, and only members having relatively small weights, e.g., an objective lens and a reflecting mirror, are arranged in the optical system driving apparatus. In this case, when vibrations are externally applied to the optical system driving apparatus, or something comes into contact with the optical system driving apparatus while the apparatus is sliding along the guide rails, an optical path between the light-emitting and light-receiving means fixed to the fixing frame and the objective lens and the reflecting mirrors arranged in the optical system driving apparatus may deviate or an error may be caused in control of the optical system driving apparatus.

Various conventional sliding movement stabilizing mechanisms have been used to prevent the above-described inconveniences caused by the gaps.

For example, as shown in a plan view of FIG. 3, in a conventional sliding movement stabilizing mechanism disclosed in Jpn. UM Appln. KOKAI Publication No. 61-40771, one end portion of an arm 66 is swingably attached on a carriage 64 of an optical system driving apparatus slidably supported on a guide rail 60 via sliding bearings 62, and a roller 68 is rotatably attached on the other end portion (free end portion) of the arm 66. The arm 66 is urged by a tension coil spring 70 to press the roller 68 on the guide rail 60, as indicated by an arrow A.

In this arrangement, the arm 66 holding the roller 68 and the tension coil spring 70 increase the number of components and weight of the optical system driving apparatus. In addition, rotating frictional resistance of the roller 68 interferes with smooth movement of the optical system driving apparatus.

In a sliding movement stabilizing mechanism disclosed in Jpn. UM Appln. KOKAI Publication No. 59-71471, as shown in a cross-sectional view in FIG. 4, a magnet 78 is attached on a lower surface of a carriage 76 of an optical system driving apparatus slidably supported on guide rails 72 via sliding bearings 74, and the carriage 76 is urged toward a deck base 80, made of a magnetic member and located below the carriage 76, by the magnetic force of the magnet 78.

In addition, a sliding movement stabilizing mechanism using a magnet is disclosed in Jpn. Pat. Appln. KOKAI Publication No. 3-5971. In this sliding movement stabilizing mechanism, as shown in plan and cross-sectional views in FIGS. 5 and 6, a carriage 82 of an optical system driving apparatus is supported on a pair of guide rails 84 via a plurality of guide rollers 86, and a magnet 88 arranged on the carriage 82 to face one of the guide rails 84 urges the plurality of guide rollers 86 against the pair of guide rails 84.

Each of the sliding movement stabilizing mechanisms using magnets, which are shown in FIGS. 4 to 6, increases the weight of the optical system driving apparatus because of the magnet. In addition, since the magnet is relatively expensive, the manufacturing cost of the optical system driving apparatus is increased.

A further sliding movement stabilizing mechanism using a magnet is disclosed in Jpn. Pat. Appln. KOKAI No. 4-149829. In this sliding movement stabilizing mechanism, as shown in a perspective view in FIG. 7, a carriage 90 of an optical system driving apparatus is supported on a pair of guide rails 92 via a plurality of guide rollers 94. The carriage 90 is attracted by the magnetic force of a magnet 96 fixed to a deck base (not shown) located below the carriage 90 to constitute a magnetic circuit for driving the carriage 90 along the pair of guide rails 92. Consequently, the plurality of guide rollers 94 are urged against the pair of guide rails 92.

With this sliding movement stabilizing mechanism, the magnet 96 does not increase the weight of the optical system driving apparatus. However, since the magnet 96 is fixed to the deck base (not shown), when the carriage 90 moves along the pair of guide rails 92, and a positional relation ship between the magnet 96 and the carriage 90 changes, magnitude of magnetic force acting between these components also changes. For this reason, a uniform, stable urging force cannot be generated throughout a moving range of the carriage 90.

SUMMARY OF THE INVENTION

The present invention has been made in consideration of the above situation, and an object of the invention is to provide an optical system driving apparatus which can improve precision in optical recording and/or reproduction of information, is small in size and weight to achieve an increase in moving speed and an improvement in resonance characteristics, and can be manufactured at low cost.

In order to achieve the above object, an optical system driving apparatus, of this invention, comprising: an optical element holding member holding an optical element and having first and second surfaces facing in opposite directions; and a carriage having first and second surfaces which are brought into contact with the first and second surfaces of the optical element holding member and slidably clamp the first and second surfaces of the optical element holding member, wherein at least one of a slidable contact surface portion of the first surface of the optical element holding member which corresponds to the first surface of the carriage and a slidable contact surface portion of the first surface of the carriage which corresponds to the first surface of the optical element holding member is formed into an at least partly spherical shape having a center coinciding with an optical center of the optical element, the other portion guides the optical element holding member to move in a circumferential direction of the spherical slidable contact surface portion, at least one of a slidable contact surface portion of the second surface of the optical element holding member which corresponds to the second surface of the carriage and a slidable contact surface portion of the second surface of the carriage which corresponds to the second surface of the optical element holding member is formed into an at least partly spherical shape having a center coinciding with the optical center of the optical element, and the other portion guides the optical element holding member to move in a circumferential direction of the spherical slidable contact surface portion.

In this arrangement, the first and second surfaces of the optical element holding member, which face in the opposite directions, are slidably clamped by the first and second surfaces of the carriage, and further the sliding contact surface positions of the first and second surfaces of each of the optical element holding member and the carriage are so designed as described above, thus providing an optical system driving apparatus which is small in size and weight, can achieve an increase in moving speed and an improvement in resonance characteristics, and can be manufactured at low cost while being designed to improve the precision in optical recording and/or reproduction of information.

In the optical system driving apparatus according to the present invention, which is characterized in the above-described arrangement, the optical element holding member has a light passage hole having a center coinciding with an optical axis of the optical element and extending through the optical element holding member along the optical axis from the first surface to the second surface; the carriage has at least one engaging projection protruding from the first surface of the carriage, inserted into the light passage hole to be arranged around the optical axis, exceeding out from the second surface of the optical element holding member, and externally engaged with the slidable contact surface portion of the second surface of the optical element holding member; and the slidable contact surface portion of the second surface of the carriage is constituted by the engaging surface of the engaging projection engaged with the slidable contact surface portion of the second surface of the optical element holding member.

When the optical system driving apparatus according to the present invention is so constructed as described above, it can be that the light passage hole has an elongated cross-section with two substantially parallel long sides, and the slidable contact surface portion of the second surface of the optical element holding member is formed along the two long sides of the cross-section of the light passage hole. In addition, the carriage can has another engaging projection arranged at a position symmetrical to the above described at least one engaging projection relative to the optical axis, and a distance between two surface portions of the two engaging projections, which face in opposite directions and are spaced apart from each other for the maximum distance, can be set to be longer than a distance between the two long sides of the cross-section of the light passage hole and smaller than a distance between two ends of the cross-section of the light passage hole in the longitudinal direction of the light passage hole.

In the optical system driving apparatus according to the present invention, which is characterized in the above arrangement, it can be that the slidable contact surface portions of the first and second surfaces of the optical element holding member are formed only in one circumferential direction with respect to the optical axis of the optical element, and the slidable contact surface portions of the first and second surfaces of the carriage are also formed only in the above described one circumferential direction with respect to the optical axis of the optical element.

In this optical system driving apparatus, it can be that the optical element holding member is constructed as a block having two surfaces facing in opposite directions, and these two surfaces are constructed as the first and second surfaces of the optical element holding member. Further, the carriage can has an opening in which the block is fitted, and an inner surface of this opening can has two surface portions facing to each other. These two surface portions can be constructed as the first and second surfaces for slidably clamping the two surfaces of the block.

Furthermore, a projection can be formed in substantially a center of one of the two surfaces of the block which is farther away from the optical axis of the optical element, and a groove can be formed in one of the two surface portions of the opening in the carriage which is brought into contact with the surface located farther away from the optical axis of the optical element. The groove extends in the direction in which the block is detached from the opening. The projection of the block is inserted in the groove. When the two surfaces of the block are slid on the two corresponding surface portions corresponding to the opening, the projection of the block can rotate about its axis in the groove of the opening and/or move in the extending direction of the groove in accordance with the sliding direction.

In order to achieve the above described object of the present invention, an optical system driving apparatus of this invention, comprising: a plurality of guide rails arranged to be parallel to each other and extend in the same direction; a carriage movably supported by the plurality of guide rails and guided in a moving direction by the plurality of guide rails; an optical element holding member holding an optical element including an objective lens and supported by the carriage to be movable in a direction along an optical axis of the objective lens; and magnetic driving means, mounted on the carriage, for driving the optical element holding member and the carriage with a magnetic force, wherein at least one of the plurality of guide rails includes a magnetic member, and a magnetic force generated by the magnetic driving means acts on at least the above described one of the guide rails to urge the carriage in a radial direction of a center line of each of the plurality of guide rails so as to press the carriage against the plurality of guide rails in the radial direction.

With this arrangement, even if vibrations are externally applied to an optical information recording/reproducing apparatus using the optical system driving apparatus, or something comes into contact with the optical system driving apparatus while the apparatus is sliding along the guide rails, rattling of the carriage with respect to the plurality of guide rails can be prevented without using various independent members including an expensive magnet other than the plurality of guide rails, the carriage, the optical element holding member, and the magnetic driving means.

As a result of this, precision in optical recording and/or reproduction of information by means of the optical element of the optical system driving apparatus can be improved, and the size and weight of the optical system driving apparatus can be reduced, thereby achieving an increase in moving speed and an improvement in resonance characteristics. Furthermore, the manufacturing cost can be reduced.

In order to achieve the above object, an optical system driving apparatus of this invention, comprising: a plurality of guide rails arranged to be parallel to each other and extend in the same direction; a carriage movably supported by the plurality of guide rails and guided in a moving direction by the plurality of guide rails; an optical element holding member holding an optical element including an objective lens and supported by the carriage to be movable in a direction along an optical axis of the objective lens; and magnetic driving means, mounted on the carriage, for driving the optical element holding member and the carriage with a magnetic force, wherein at least one of the plurality of guide rails includes a magnetic member, a magnetic force generated by the magnetic driving means acts on at least the above described one of the guide rails to urge the carriage in a radial direction of a center line of each of the plurality of guide rails so as to press the carriage against the plurality of guide rails in the radial direction, the optical element holding member has first and second surfaces facing in opposite directions, the carriage has first and second surfaces which are brought into contact with the first and second surfaces of the optical element holding member and slidably clamp the first and second surfaces, at least one of a slidable contact surface portion of the first surface of the optical element holding member which corresponds to the first surface of the carriage and a slidable contact surface portion of the first surface of the carriage which corresponds to the first surface of the optical element holding member is formed into an at least partly spherical shape having a center coinciding with an optical center of the optical element, the other portion guides and moves the optical element holding member in a circumferential direction of the spherical slidable contact surface portion, at least one of a slidable contact surface portion of the second surface of the optical element holding member which corresponds to the second surface of the carriage and a slidable contact surface portion of the second surface of the carriage which corresponds to the second surface of the optical element holding member is formed into an at least partly spherical shape having a center coinciding with the optical center of the optical element, and the other portion guides and moves the optical element holding member in a circumferential direction of the spherical slidable contact surface portion.

In this arrangement, the first and second surfaces of the optical element holding member, which face in the opposite directions, are slidably clamped by the first and second surfaces of the carriage, and further the sliding contact surface portions of the first and second surfaces of each of the optical element holding member and the carriage are so designed as described above, thus providing an optical system driving apparatus which is small in size and weight, can achieve an increase in moving speed and an improvement in resonance characteristics, and can be manufactured at low cost while being designed to improve the precision in optical recording and/or reproduction of information.

In addition, magnetic force generated by the magnetic driving means mounted on the carriage acts on at least one of the plurality of guide rails to urge the carriage in the radial direction of the center line of each of the plurality of guide rails so as to press the carriage against the plurality of guide rails in the radial direction. With this operation, even if vibrations are externally applied to an optical information recording/reproducing apparatus using the optical system driving apparatus, or something comes into contact with the optical system driving apparatus while the apparatus is sliding along the guide rails, rattling of the carriage with respect to the plurality of guide rails can be prevented without using various independent members including an expensive magnet other than the plurality of guide rails, the carriage, the optical element holding member, and the magnetic driving means.

As a result, the precision in optical recording and/or reproduction of information by means of the optical element of the optical system driving apparatus can be improved, and the size and weight of the optical system driving apparatus can be reduced, thereby achieving an increase in moving speed and an improvement in resonance characteristics. Furthermore, the manufacturing cost can be reduced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 25 is a fragmentary and schematically cross-sectional view showing an operation of a sliding movement stabilizing mechanism for stabilizing a sliding movement of the carriage with respect to a plurality of guide rails by using a magnetic force generated by a magnetic driving means for driving an objective lens of the optical element holding unit in the optical system driving apparatus in FIG. 22;

FIG. 31 is a schematic exploded perspective view of a base block of an optical element holding unit of a main portion of a modification of the third embodiment of the optical system driving apparatus of this invention in FIGS. 19 to 21, and a carriage supporting the block, when viewed from an oblique upper front side of the main part.

DETAILED DESCRIPTION OF THE PREFERRED EMBODIMENTS

Various embodiments of an optical system driving apparatus of the present invention will be described in detail below with reference to the accompanying drawings from FIG. 8.

[First Embodiment]

Figure 1:
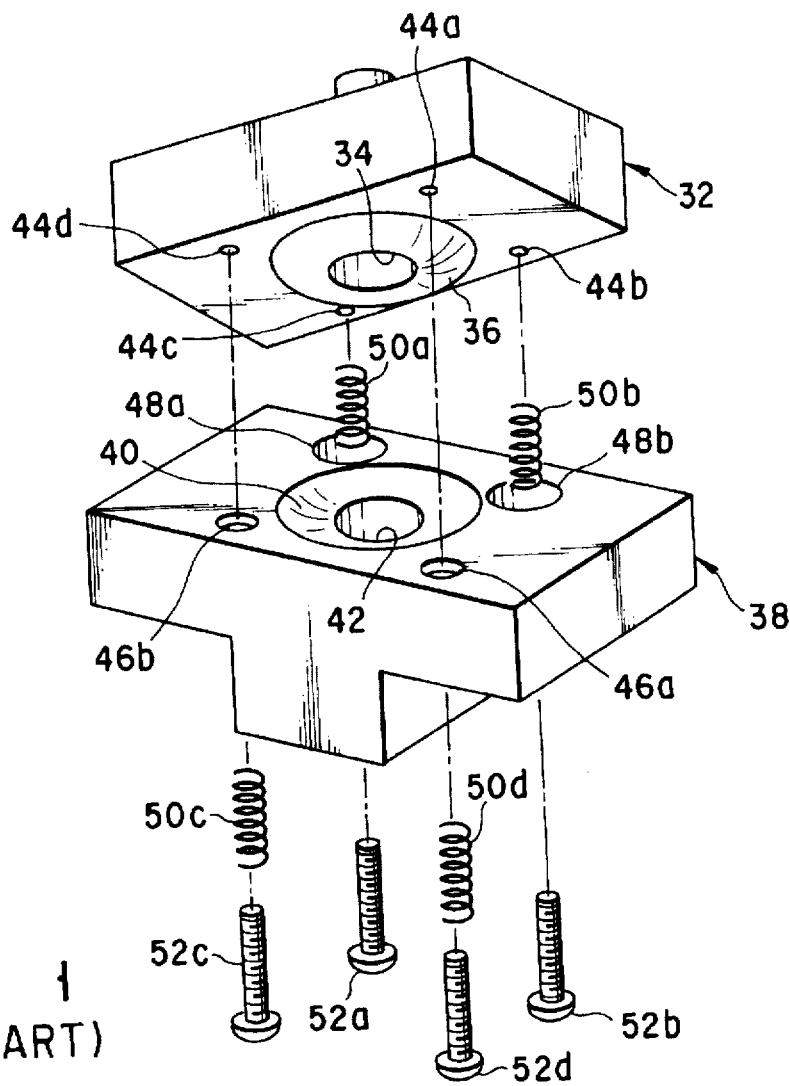
FIG. 1 is an exploded perspective view schematically showing an optical axis adjustment mechanism, used in a production line of conventional optical information recording/reproducing apparatuses for adjusting the optical axis of an optical element held by an optical system driving apparatus.
Figure 2:
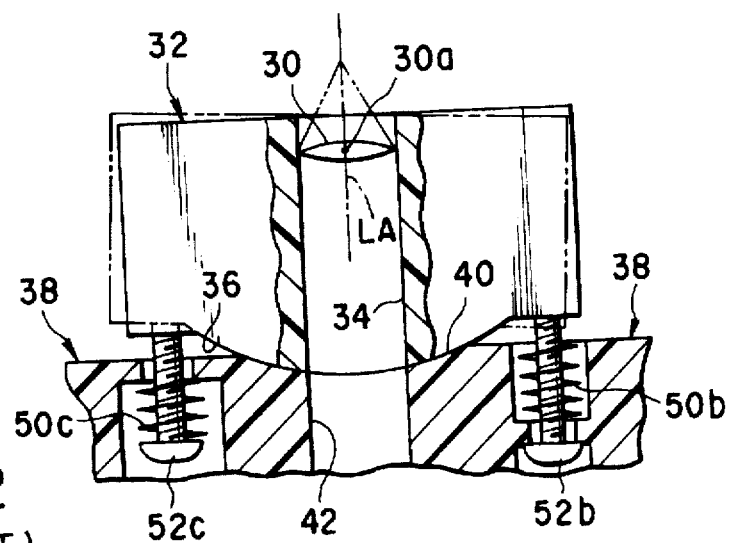
FIG. 2 is a schematic cross-sectional view showing operation of the optical axis adjustment mechanism in FIG. 1.
Figure 3:
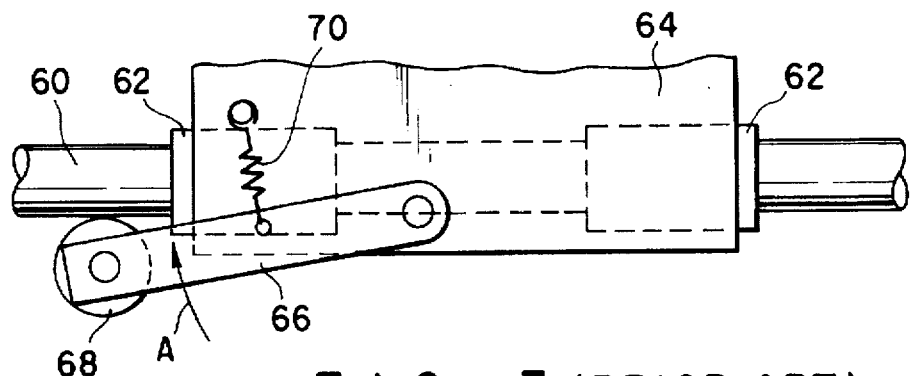
FIG. 3 is a schematic plan view showing a sliding movement stabilizing mechanism of an optical system driving apparatus of a conventional optical information recording/reproducing apparatus.
Figure 4:
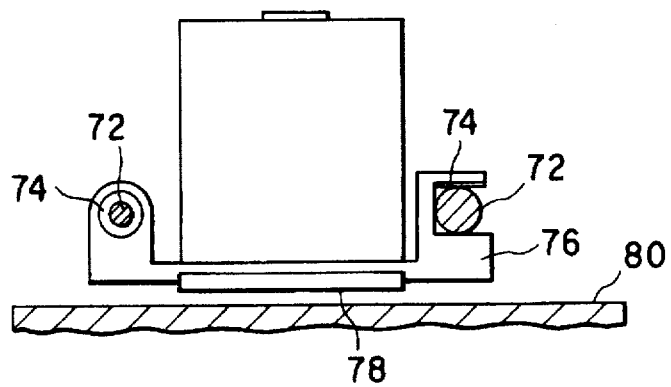
FIG. 4 is a schematic cross-sectional view showing another sliding movement stabilizing mechanism of an optical system driving apparatus of a conventional optical information recording/reproducing apparatus.
Figure 5:
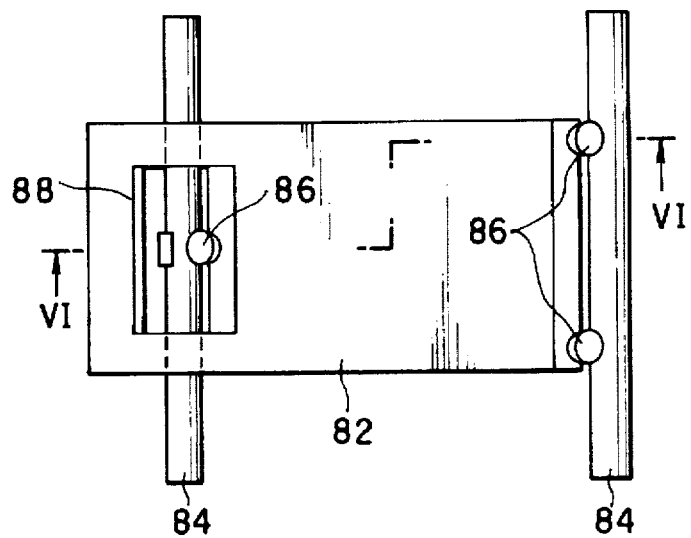
FIG. 5 is a plan view schematically showing still another sliding movement stabilizing mechanism of an optical system driving apparatus of a conventional optical information recording/reproducing apparatus.
Figure 6:
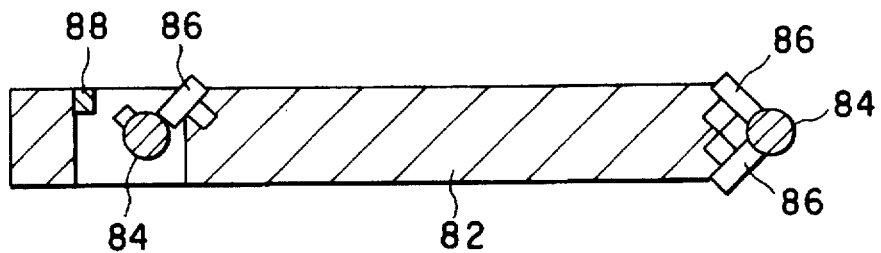
FIG. 6 is a cross-sectional view taken along a line VI—VI in FIG. 5.
Figure 7:
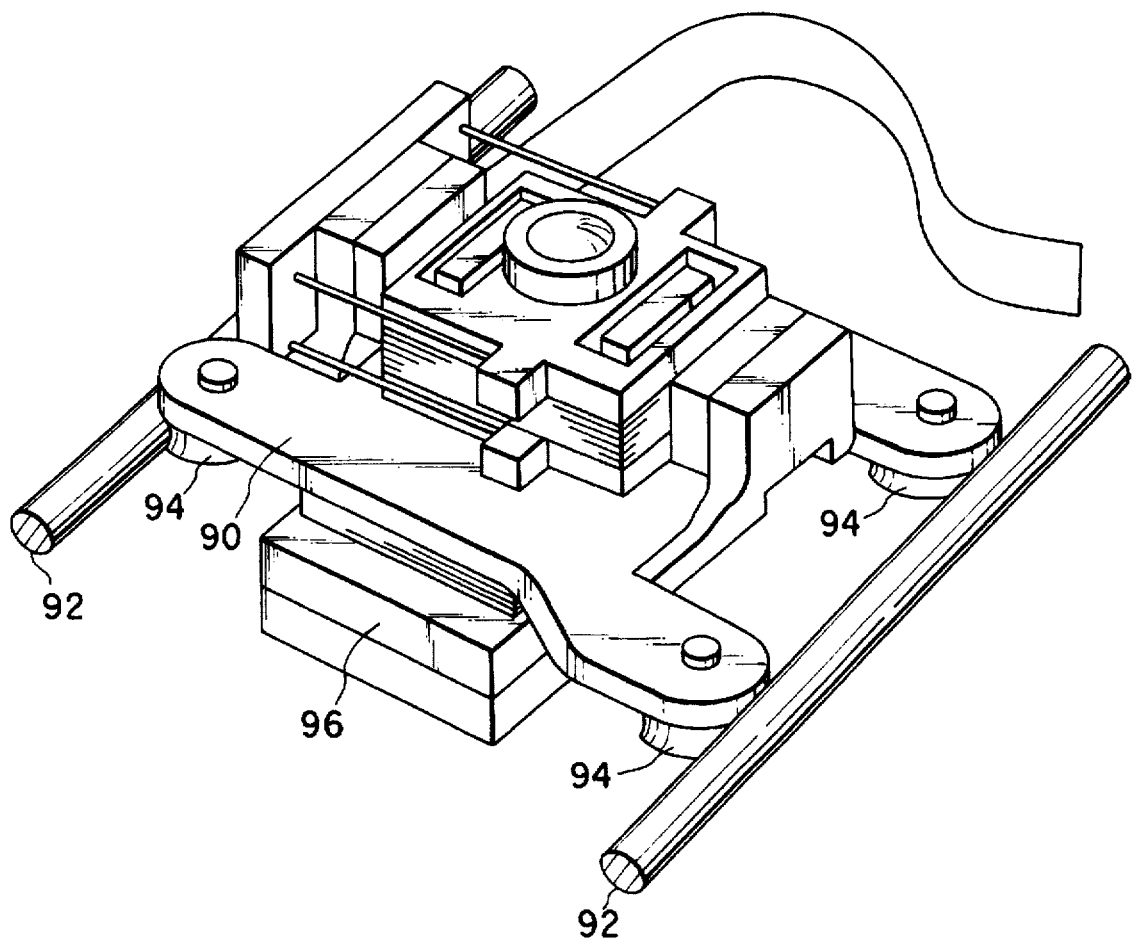
FIG. 7 is a perspective view schematically showing still another sliding movement stabilizing mechanism of an optical system driving apparatus of a conventional optical information recording/reproducing apparatus.
Figure 8:
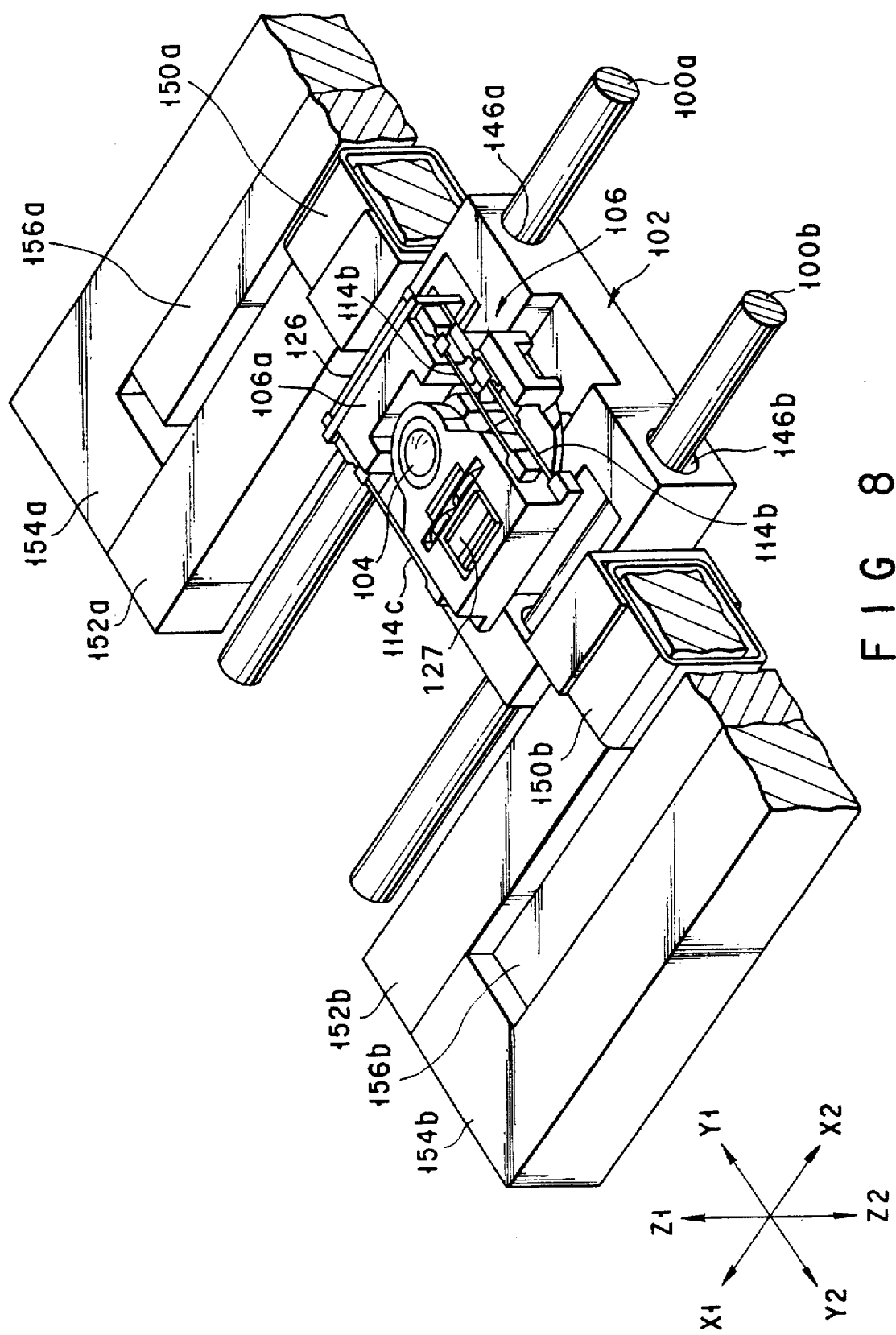
FIG. 8 is a schematic perspective view showing a main part of a first embodiment of an optical system driving apparatus of this invention, when viewed downward obliquely.
Figure 9:
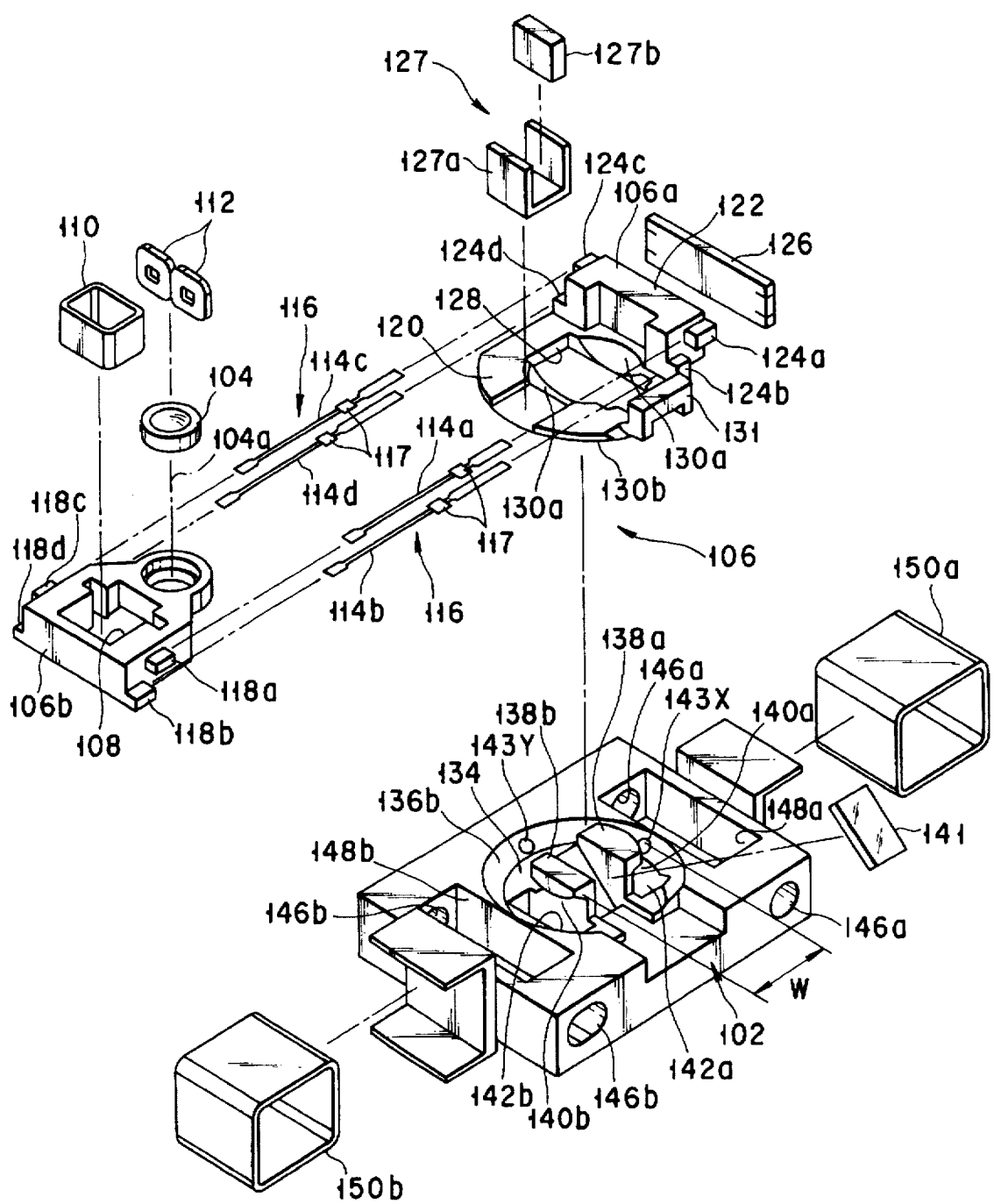
FIG. 9 is a schematic exploded perspective view showing an optical element holding unit and a carriage supporting the unit, which constitute the main part of the optical system driving apparatus shown in FIG. 8.

FIG. 8 shows a perspective view of a first embodiment of the optical system driving apparatus of the present invention. FIG. 9 shows an exploded perspective view of a main part of the first embodiment in FIG. 8.

The optical system driving apparatus of the present invention is used in an optical information recording/reproducing apparatus for optically recording and/or reproducing information on/from a disk-like information recording medium.

In the optical information recording/reproducing apparatus, the optical system driving apparatus is disposed below a disk-like information recording medium (not shown) which is placed at a predetermined position in an information recording medium housing space (not shown) in the recording/reproducing apparatus and is rotated in a predetermined direction at a predetermined speed. The optical system driving apparatus comprises two guide rails 100a and 100b and a carriage 102. The two guide rails 100a and 100b extend in a radial direction of the disk-like information recording medium and are arranged to be parallel to a lower surface of the recording medium. The carriage 102 is slidably supported by the two guide rails 100a and 100b to be guided in the sliding direction thereby. Each of the guide rails 100a and 100b is made of a magnetic material having high rigidity, e.g., a steel member. The carriage 102 is made of a lightweight material having good sliding characteristics, e.g., polyphenylene sulfide.

An optical element holding unit 106 holding an objective lens 104 is mounted on an upper surface of the carriage 102. The objective lens 104 serves as one of optical elements used to optically record and/or reproduce information on/from the disk-like information recording medium (not shown). As shown in FIG. 9, the optical element holding unit 106 has a base member 106a and an objective lens focus adjustment member 106b. The base member 106a is placed on the upper surface of the carriage 102. The objective lens focus adjustment member 106b holds the objective lens 104 and is supported on the base member 106a to be movable in a direction along an optical axis 104a of the objective lens 104 (i.e., focusing directions indicated by arrows Z1 and Z2)

and in the radial direction of the disk-like information recording medium (not shown) (i.e., tracking directions indicated by arrows X1 and X2 and also the extending directions of the two guide rails 100a and 100b).

An opening 108 is formed in the objective lens focus adjustment member 106b at the side of the objective lens 104. A focusing coil 110 and tracking coils 112 are fixed in the opening 108 to face in predetermined directions, respectively. More specifically, a center line of the central opening of the focusing coil 110 extends in a direction along the optical axis 104a of the objective lens 104 to be parallel to the optical axis 104a. The center line of the central opening of each of the tracking coils 112 extends in directions indicated by arrows Y1 and Y2, which directions are almost perpendicular to both the directions (indicated by the arrows Z1 and Z2) along the optical axis 104a and the radial directions (indicated by arrows X1 and X2) of the disk-like information recording medium (not shown).

The objective lens focus adjustment member 106b is supported on the carriage 102 via a movable supporting member 116 including four leaf springs 114a, 114b, 114c, and 114d. The leaf springs 114a, 114b, 114c, and 114d are arranged in pairs on two side surfaces of the objective lens focus adjustment member 106b in the extending direction (indicated by the arrows X1 and X2) of the two guide rails 100a and 100b, and extend in directions indicated by the arrows Y1 and Y2 to be parallel to each other. Each of the pairs of leaf springs 114a and 114b, and 114c and 114d arranged on the two side surfaces of the objective lens focus adjustment member 106b are spaced apart from each other by a predetermined distance in the focusing directions indicated by the arrows Z1 and Z2.

Each of the leaf springs 114a, 114b, 114c, and 114d is made of a conductive material such as a metal. A known anti-vibration member 117 formed by covering a known viscoelastic material with, e.g., an aluminum foil is bonded to each leaf spring.

Two pairs of leaf spring support projections 118a and 118b, and 118c and 118d are respectively formed on the two side surfaces of the objective lens focus adjustment member 106b. Each of the pairs of leaf spring support projections 118a, 118b, 118c, and 118d are spaced apart from each other by predetermined distances in the X1 and X2 directions and the Y1 and Y2 directions. The two leaf spring support projections 118a and 118b on one side surface in the X2 direction are arranged to be symmetrical to the leaf spring support projections 118c and 118d on the other side surface in the X1 direction. The Y2-direction end portions of the two leaf springs 114a and 114b are fixed to the two corresponding leaf spring support projections 118a and 118b, respectively. The Y2-direction end portions of the two leaf springs 114c and 114d are fixed to the two corresponding leaf spring support projections 118c and 118d on the other side surface, respectively.

The base member 106a is made of a lightweight material having high rigidity, e.g., Liquid Crystal Polymer. The base member 106a has a slide portion 120 having a substantially annular, flat surface, and an upward protruding island portion 122 protruding upward from a portion (a right end portion in FIGS. 8 and 9) of an upper surface of the slide portion 120 which is an end surface in the Z1 direction.

Similar to the two pairs of leaf spring support projections 118a and 118b, and 118c and 118d on the two side surfaces of the objective lens focus adjustment member 106b, two pairs of leaf spring support projections 124a and 124b, and 124c and 124d are formed on two side surfaces of the upward protruding island portion 122 in the extending directions of the two guide rails 100a and 100b, which directions are indicated by the arrows X1 and X2. Each of the pairs of leaf spring support projections 124a and 124b, and 124c and 124d are spaced apart from each other by predetermined distances in the X1 and X2 directions and the Y1 and Y2 directions. The two leaf spring support projections 124a and 124b on one side surface in the X2 direction are arranged to be symmetrical to the two leaf spring support projections 124c and 124d on the other side surface in the X1 direction. The Y1-direction end portions of the two leaf springs 114a and 114b are fixed to the two corresponding leaf spring support projections 124a and 124b on one side surface, respectively. The Y1-direction end portions of the two leaf springs 114c and 114d are fixed to the two corresponding leaf spring support projections 124c and 124d on the other side surface, respectively.

The four leaf springs 114a, 114b, 114c, and 114d are electrically connected to a wiring pattern (not shown) on a printed wiring board 126 fixed to the upward protruding island portion 122 of the base member 106a and also electrically connected to the focusing coil 110 and the tracking coils 112 of the objective lens focus adjustment member 106b via a wiring pattern (not shown). That is, the focusing coil 110 and the tracking coils 112 of the objective lens focus adjustment member 106b are connected to an electrical control means (not shown) of the optical information recording/reproducing apparatus via the four leaf springs 114a, 114b, 114c, and 114d, the printed wiring board 126, and a flexible wiring board (not shown) electrically connected to the printed wiring board 126.

The objective lens focus adjustment member 106b supported on the upward protruding island portion 122 of the base member 106a by the four leaf springs 114a, 114b, 114c, and 114d is located above the slide portion 120 of the base member 106a. At this position, the objective lens 104 of the objective lens focus adjustment member 106b opposes a light passage hole 128 formed in almost the center of the slide portion 120.

A yoke unit 127 is arranged on the upper surface of the slide portion 120 at a position almost symmetrical to the upward protruding island portion 122. The yoke 127 includes a yoke 127a having a substantially U-shaped cross-section, and a magnet 127b disposed in a central recess portion of the yoke 127a. In the opening 108 of the objective lens focus adjustment member 106b, one side wall (located farther from the objective lens 104) of the yoke 127a and the magnet 127b are inserted in the central opening of the focusing coil 110, whereas the other side wall (located nearer to the objective lens 104) of the yoke 127a is inserted between a gap between the tracking coils 112 and the objective lens 104.

With this arrangement, the yoke unit 127 of the base member 106a operates with the focusing coil 110 and the tracking coils 112 of the objective lens focus adjustment member 106b, thus constituting magnetic driving means for driving the objective lens focus adjustment member 106b with a magnetic force to move the objective lens 104 by desired small distances in the focusing directions indicated by the arrows Z1 and Z2 and the tracking directions indicated by the arrows X1 and X2 against the elastic forces of the four leaf springs 114a, 114b, 114c, and 114d. The magnetic driving means can drive the objective lens focus adjustment member 106b in the above-described manner by causing the above described electrical control means (not shown) of the optical information recording/reproducing apparatus to control currents supplied to the focusing coil 110 and the tracking coils 112 via the flexible wiring board (not shown) electrically connected to the printed wiring board 126, the printed wiring board 126, and the four leaf springs 114a, 114b, 114c, and 114d. The magnetic driving means constituted by such a combination of components is known.

Figure 10:
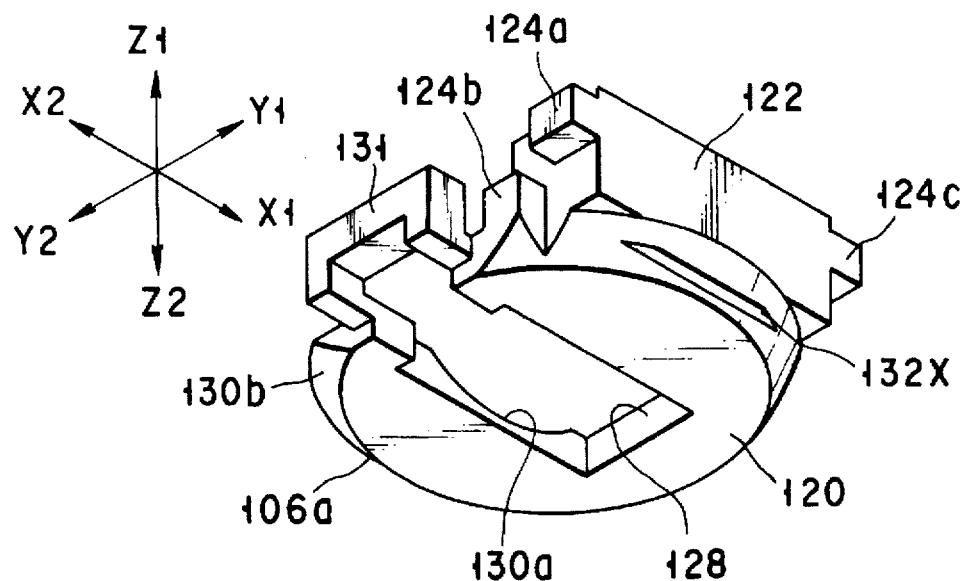
FIG. 10 is a schematic perspective view showing a base member of the optical element holding unit in FIG. 9, when viewed upward obliquely.
Figure 11:
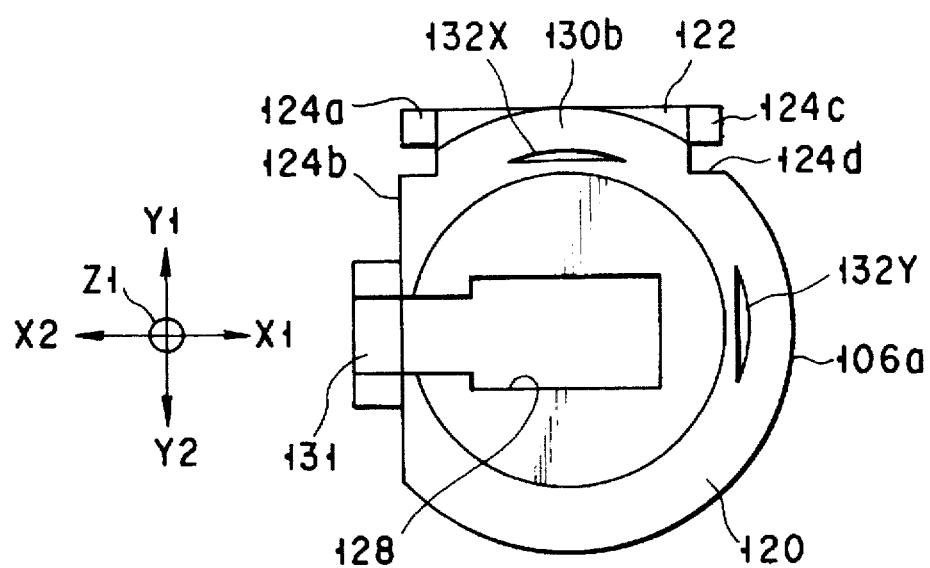
FIG. 11 is a schematic bottom view of the base member in FIG. 10.

FIG. 10 is a schematic perspective view showing a side surface (a lower surface in FIG. 9; will be referred to as the lower surface hereinafter) of the base member 106a in the Z2 direction. FIG. 11 is a view (to be referred to as a bottom view hereinafter) showing the side surface of the base member 106a in the Z2 direction when viewed in the Z1 direction. The base member 106a will be described in detail below with reference to FIGS. 10, 11, and 9.

The light passage hole 128 in the slide portion 120 of the base member 106a has an elongated shape with two long sides extending in the tracking directions indicated by the arrows X1 and X2 to be almost parallel to each other.

First and second slidable contact surface portions 130a and 130b are respectively formed on first and second surfaces of the slide portion 120 of the base member 106a, which face in the opposite directions indicated by the arrows Z1 and Z2. Each slidable contact surface portion has a partly spherical shape whose center coincides with the optical center of the objective lens 104 of the objective lens focus adjustment member 106b supported on the base member 106a in the above manner. In this embodiment, as best shown in FIG. 11, when viewed from the Z1 direction, the second slidable contact surface portion 130b extends in a substantially annular shape around the optical axis 104a of the objective lens 104, while being notched only in the X2 direction. The notched portion of the second slidable contact surface portion 130b is coupled to a bridge-like portion 131 protruding upward in the Z1 direction, thus preventing a decrease in the rigidity of the slide portion 120.

As clearly shown in FIG. 9, when viewed from the Z2 direction, the first slidable contact surface portion 130a is constituted by two portions formed along the two long sides of the light passage hole 128 to be centered on the optical axis 104a of the objective lens 104.

As shown in FIGS. 10 and 11, the second slidable contact surface portion 130b has an elongated groove 132X formed in its end portion in the direction indicated by the arrow Y1 to extend in the tracking directions indicated by the arrows X1 and X2, and also has an elongated groove 132Y formed in its end portion in the direction indicated by the arrow X1 to extend in the directions indicated by the arrows Y1 and Y2.

A structure of the carriage 102 will be described in detail next with reference to FIGS. 8 and 9.

A recess portion 134 is formed in a central portion of the upper surface of the carriage 102, which faces upward along the direction indicated by the arrow Z1. The lower surface (the second surface of the slide portion 120 of the base member 106a of the optical element holding unit 106, which faces downward along the direction indicated by the arrow Z2, is seated in the recess portion 134. Similar to the second slidable contact surface portion 130b of the slide portion 120 of the base seat 106a, an inlet opening end of the recess portion 134 is formed as a slidable contact surface portion 136b having a partly spherical shape whose center coincides with the optical center of the objective lens 104 of the optical element holding unit 106 seated in the above manner. As clearly shown in FIG. 9, when viewed downward along the direction indicated by the arrow Z2, the slidable contact surface portion 136b extends in a substantially annular shape around the optical axis 104a of the objective lens 104, while being notched only in the X2 direction, in correspondence with the second slidable contact surface portion 130b of the slide portion 120 of the base member 106a.

In this embodiment, the upper surface of the carriage 102 which faces upward along the direction indicated by the arrow Z1 will also be referred to as a second surface hereinafter because the lower surface (the second surface) of the slide portion 120 of the base member 106a is seated in the recess portion 134 as described above. In addition, the slidable contact surface portion 136b of the inlet opening end of the recess portion 134 in the second surface of the carriage 102 will also be referred to as a second slidable contact surface portion hereinafter because the second slidable contact surface portion 130b of the slide portion 120 of the base member 106a is brought into slidable contact with the slidable contact surface portion 136b.

As clearly shown in FIG. 9, when viewed downward along the direction indicated by the arrow Z2, the slidable contact surface portion 136b extends in a substantially annular shape around the optical axis 104a of the objective lens 104, while being notched only in the X2 direction, in correspondence with the second slidable contact surface portion 130b of the slide portion 120 of the base member 106a.

The notched portion of the second slidable contact surface portion 136b serves as a groove formed in the upper surface (the second surface) of the carriage 102.

A pair of engaging projections 138a and 138b are formed on a center of the recess portion 134 of the carriage 102 to extend upward along the direction indicated by the arrow Z1. The pair of engaging projections 138a and 138b are spaced apart from each other by a predetermined distance in the lateral directions indicated by the arrows Y1 and Y2. The upward protruding end portion of the engaging projection 138a, located in a right direction indicated by the arrow Y1, is bent in the right direction indicated by the arrow Y1, whereas the upward protruding end portion of the engaging projection 138b, located in a left direction indicated by the arrow Y2, is bent in the left direction indicated by the arrow Y2.

Similar to the second slidable contact surface portion 136b of the inlet opening end of the recess portion 134, regions of the upward protruding portions of the pair of engaging projections 138a and 138b, which are bent to face downward along the direction indicated by the arrow Z2 are formed as slidable contact surface portions 140a and 140b each of which have a partly spherical shape whose center coincides with the optical center of the objective lens 104 of the optical element holding unit 106 seated in the recess portion 134. These slidable contact surface portions 140a and 140b face the second slidable contact surface portion 136b in the radial direction of the above spherical shape and will be referred to as a first slidable contact surface portions 140a and 140b of the carriage 102 hereinafter, and the regions of the upward protruding end portions of the pair of engaging projections 138a and 138b having the first slidable contact surface portions 140a and 140b, which face downward along the direction indicated by the arrow Z2, will be referred to as a first surface of the carriage 102 hereinafter.

A distance between the second slidable contact surface portion 136b of the carriage 102 which substantially faces upward along the direction indicated by the arrow Z1 and the first slidable contact surface portions 140a and 140b which face the second slidable contact surface portion 136b and substantially face downward along the direction indicated by the arrow Z2 is set to be slightly smaller than a distance between the first and second slidable contact surface portions 130a and 130b formed on the first and second surfaces of the slide portion 120 of the base member 106a, which face in the opposite directions indicated by the arrows Z1 and Z2. A distance W between end faces of the upward protruding end portions of the pair of engaging projections 138a and 138b of the carriage 102, which face in the opposite directions indicated by the arrows, Y1 and Y2 is set to be longer than the distance between the two long sides of the light passage hole 128 in the slide portion 120 of the base member 106a and shorter than the length of the light passage hole 128 in the longitudinal direction. In addition, length of a diagonal line connecting proximal ends of the pair of engaging projections 138a and 138b is set to be smaller than the distance between the two long sides of the light passage hole 128.

A portion of a bottom surface of the recess portion 134, located between the pair of engaging projections 138a and 138b, is formed into a slope inclined upward at about 45° from the direction indicated by the arrow X2 to the direction indicated by the arrow Z1. A laser reflecting mirror 141 is bonded to this slope.

Through holes 142a and 142b are formed in regions of the bottom surface of the recess portion 134, which are adjacent to the proximal ends of the pair of engaging projections 138a and 138b in the directions indicated by the arrows Y1 and Y2 (i.e., outside the pair of engaging projections 138a and 138b in the directions indicated by the arrows Y1 and Y2), to extend through the carriage 102 to the lower surface of the carriage 102 which faces downward along the direction indicated by the arrow Z2. The through holes 142a and 142b allow the use of a separable mold (not shown), which can be separated in vertical directions indicated by the arrows Z1 and Z2. Therefore, the pair of engaging projections 138a and 138b having the upward protruding end portions bent in the directions indicated by the arrows Y1 and Y2 as described above are formed simultaneously with the remaining portions of the carriage 102 by using the same material when injection molding of the carriage 102 is performed.

Inclination adjustment holes 143Y and 143X are respectively formed in end regions of the second slidable contact surface 136b of the carriage 102 in the directions indicated by the arrows X1 and Y1. The inclination adjustment holes 143Y and 143X extend through the carriage 102 along normal lines of the respective end regions from the second slidable contact surface portion 136b of the upper surface of the carriage 102 which faces in the direction indicated by the arrow Z1 to the lower surface of the carriage 102 which faces in the direction indicated by the arrow Z2.

Diameter of each of the inclination adjustment holes 143Y and 143X is set to be larger than width of each of the two elongated grooves 132X and 132Y in the second slidable contact surface portion 130b of the slide portion 120 of the base member 106a of the optical element holding unit 106.

Figure 12:
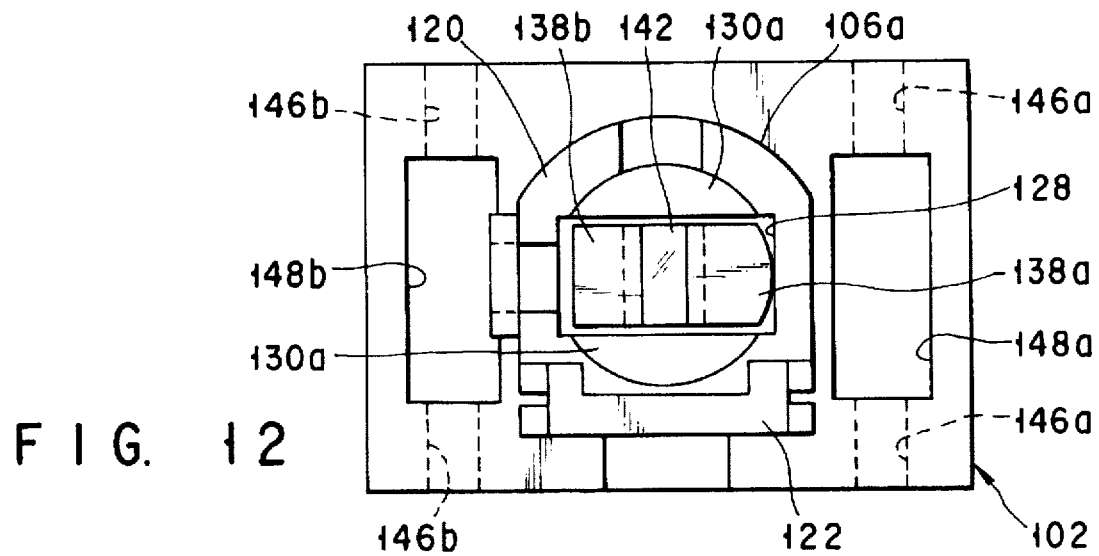
FIG. 12 is a schematic plan view showing a first half portion of a process of slidably coupling the base member of the optical element holding unit in FIG. 9 to the carriage in FIG. 9, when viewed from above the carriage and the base member.
Figure 13:
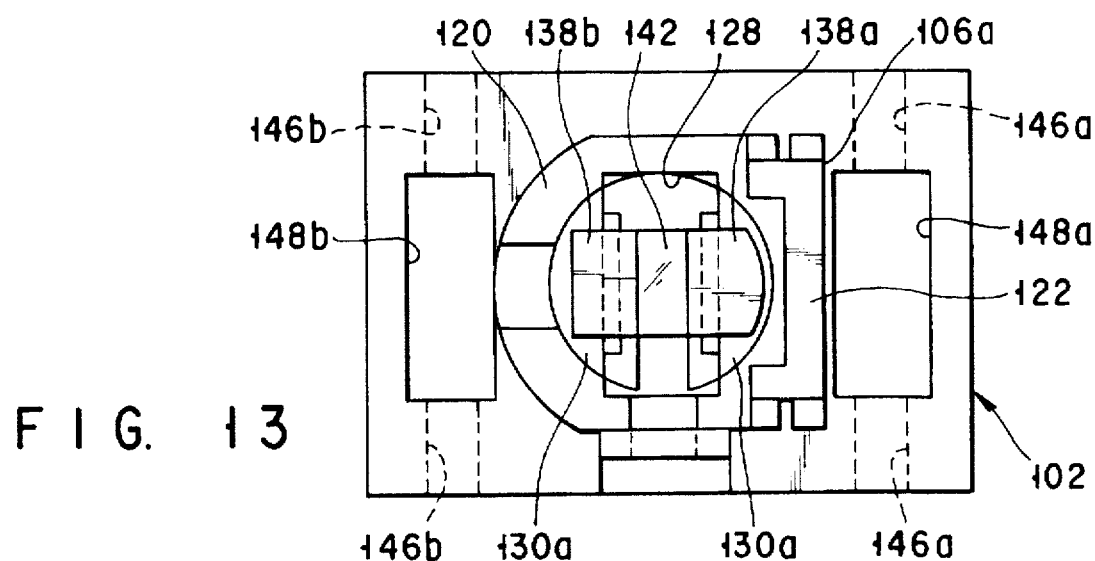
FIG. 13 is a schematic plan view showing a second half portion of the process of slidably coupling the base member of the optical element holding unit in FIG. 9 to the carriage in FIG. 9, when viewed from above the carriage and the base member.

FIGS. 12 and 13 show steps in mounting the optical element holding unit 106, which is separated from the carriage 102 as shown in FIG. 9, in the recess portion 134 in the upper surface of the carriage 102 in a production line of the optical system driving apparatus.

Note that FIGS. 12 and 13 not show all components of the optical element holding unit 106 but show only the base member 106a included in the components of the optical element holding unit 106 to clear illustration thereof.

First of all, the base member 106a of the optical element holding unit 106 is placed above the recess portion 134 in the upper surface of the carriage 102, and the directions in which the two long sides of the light passage hole 128 in the central portion of the base member 106a of the optical element holding unit 106 extend are made to coincide with the directions of the two end surfaces (facing in the opposite directions) of the bent regions of the upward protruding end portions of the pair of engaging projections 138a and 138b in the recess portion 134 in the upper surface of the carriage 102. Subsequently, as shown in FIG. 12, the light passage hole 128 in the base member 106a of the optical element holding unit 106 is fitted on the pair of engaging projections 138a and 138b of the upper surface of the carriage 102 and is lowered until the second slidable contact surface portion 130b of the slide portion 120 of the base member 106a is brought into contact with the second slidable contact surface portion 136b (FIG. 9) of the upper surface of the carriage 102. At this time, the bent regions of the upward protruding end portions of the pair of engaging projections 138a and 138b protrude upward from an opening of the light passage hole 128 in the upper surface of the base member 106a of the optical element holding unit 106.

Furthermore, as shown in FIG. 13, by rotating the base member 106a through about 90° from a position shown in FIG. 12, the first slidable contact surfaces 140a and 140b (FIG. 9) of the bent regions of the upward protruding end portions of the pair of engaging projections 138a and 138b of the upper surface of the carriage 102, which face downward in the direction indicated by the arrow Z2, are placed on the first slidable contact surface portions 130a extending along the two long sides of the light passage hole 128 of the base member 106a of the optical element holding unit 106.

As described above, the distance between the second slidable contact surface portion 136b of the carriage 102 and the first slidable contact surfaces 140a and 140b thereof is set to be slightly smaller than the distance between the second and first slidable contact surface portions 130b and 130a of the slide portion 120 of the base member 106a of the optical element holding unit 106. In addition, the pair of engaging projections 138a and 138b of the carriage 102 are made of a material having good sliding characteristics, e.g., polyphenylene sulfide, together with the remaining portions of the carriage 102, and are slightly elastic. Therefore, the slide portion 120 of the base member 106a of the optical element holding unit 106 is clamped at its first and second slidable contact surface portions 130a and 130b by the first slidable contact surfaces 140a and 140b of the pair of engaging projections 138a and 138b and the slidable contact surface portion 136b of the recess portion 134 in the upper surface of the carriage 102 to be slidable along these partly spherical portions.

That is, the slide portion 120 of the base member 106a of the optical element holding unit 106 can be inclined at a desired angle with respect to the center of the objective lens 104 in a desired direction within a predetermined range with respect to the carriage 102. Hence, the optical axis 104a (FIG. 9) of the objective lens 104 (as an optical element) held by the optical element holding unit 106 can be inclined at a desired angle in a desired direction within a predetermined range.

Therefore, in the production line of the optical information recording/reproducing apparatus using the first embodiment of the optical system driving apparatus of the present invention, the optical axis 104a of the objective lens 104 can be finely adjusted to be perpendicular to the above-mentioned information recording surface of the disk-like information recording medium (not shown) arranged at a predetermined position in the optical information recording/reproducing apparatus.

Figure 14:
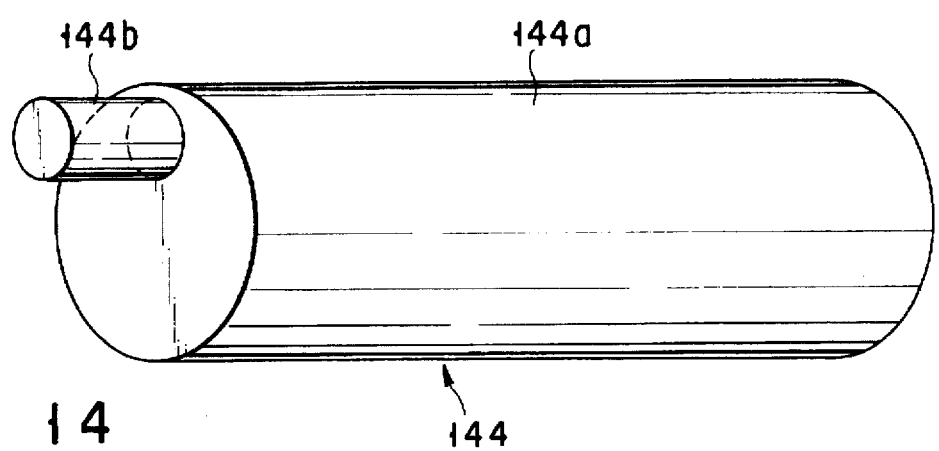
FIG. 14 is a schematic perspective view showing an inclination fine adjustment tool used to finely adjust inclination of an optical axis of an objective lens as an optical element of the optical element holding unit supported on the carriage in the optical system driving apparatus in FIG. 8.

FIG. 14 shows an inclination fine adjustment tool 144 used for the above fine adjustment. The inclination fine adjustment tool 144 includes a columnar body 144a and a pin 144b. The body 144a has a diameter slightly smaller than that of each of the inclination adjustment holes 143Y and 143X in the slidable contact surface portion 136b of the carriage 102 shown in FIG. 9, and a length longer than that of each of the inclination adjustment holes 143Y and 143X. The pin 144b is formed on one end surface of the body 144a at a position decentered from the longitudinal center line of the body 144a.

The diameter of the pin 144b is set to be smaller than the width of each of the two elongated grooves 132X and 132Y of the second slidable contact surface portion 130b of the slide portion 120 of the base member 106a of the optical element holding unit 106.

Figure 15:
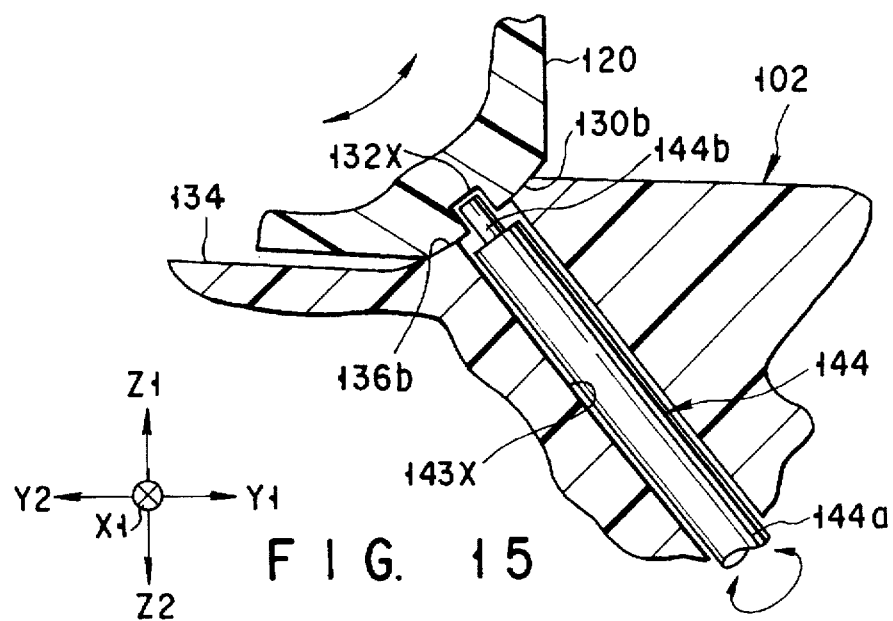
FIG. 15 is a schematic enlarged cross-sectional view showing an application state of the inclination fine adjustment tool in FIG. 14.

When the above fine adjustment is to be performed, the inclination fine adjustment tool 144 is inserted into each of the inclination adjustment holes 143Y and 143X in the second slidable contact surface portion 136b of the carriage 102 from the lower surface of the carriage 102, which faces downward along the direction indicated by the arrow Z2, with the eccentric pin 144b being at a leading end of the body 144a, such that the eccentric pin 144b is inserted in each of the two elongated grooves 132X and 132Y of the second slidable contact surface portion 130b of the slide portion 120 of the base member 106a of the optical element holding unit 106. FIG. 15 shows a state wherein the eccentric pin 144b of the inclination fine adjustment tool 144 inserted in one inclination adjustment hole 143X is inserted in the corresponding elongated groove 132X of the second slidable contact surface portion 130b of the slide portion 120 of the base member 106a of the optical element holding unit 106.

In this arrangement, when an externally exposed end portion of the inclination fine adjustment tool 144 inserted in the inclination adjustment hole 143X is rotated, the eccentric pin 144b of the inclination fine adjustment tool 144 is moved in vertical directions indicated by the arrows Z1 and Z2, in the corresponding elongated groove 132X of the second slidable contact surface portion 130b of the slide portion 120 of the base member 106a of the optical element holding unit 106. With this operation, the optical axis 104a of the objective lens 104 of the optical element holding unit 106 can be swung around a center line (not shown) extending in the directions indicated by the arrows X1 and X2, in the directions indicated by the arrows Y1 and Y2 within a predetermined range.

When the externally exposed end portion of the inclination fine adjustment tool 144 inserted in the other inclination adjustment hole 143Y is rotated, the eccentric pin 144b of the inclination fine adjustment tool 144 is moved in the vertical directions indicated by the arrows Z1 and Z2, in the corresponding elongated groove 132Y of the second slidable contact surface portion 130b of the slide portion 120 of the base member 106a of the optical element holding unit 106. With this operation, the optical axis 104a of the objective lens 104 of the optical element holding unit 106 can be swung around a center line (not shown) extending in the directions indicated by the arrows Y1 and Y2, in the directions indicated by the arrows X1 and X2 within a predetermined range.

As a result, the optical axis 104a of the objective lens 104 of the optical element holding unit 106 can be set in a desired direction at a desired angle within the range of a cone having a predetermined interior angle and centered on the center of the objective lens 104 by adjusting the rotational angles of the external exposed end portions of the two inclination fine adjustment tools 144 inserted in the two inclination adjustment holes 143X and 143Y.

After the above fine adjustment, the inclination fine adjustment tools 144 are respectively removed from the two inclination adjustment holes 143X and 143Y, and the second slidable contact surface portion 130b of the slide portion 120 of the base seat 106a of the optical element holding unit 106 is fixed to the second slidable contact surface portion 136b of the carriage 102 with, e.g., an adhesive. The adhesive is injected, via the through holes 142a and 142b for forming the pair of engaging projections 138a and 138b, from the lower surface side of the carriage 102 which faces downward along the direction indicated by the arrow Z2 into a minute space between the inner surface of the carriage 102, which includes the second slidable contact surface portion 136b of the recess portion 134 of the carriage 102, and the lower surface (including the second slidable contact surface portion 130b) of the slide portion 120 of the base member 106a of the optical element holding unit 106 which is seated in the recess portion 134 of the carriage 102 and faces downward along the direction indicated by the arrow Z2. Alternatively, the adhesive may be injected into the minute space via the two inclination adjustment holes 143X and 143Y after the inclination fine adjustment tools 144 are removed therefrom.

In this case, from a time when the above described fine adjustment is completed to a time when the adhesive injected in the above manner is hardened, the first and second slidable contact surface portions 130a and 130b of the slide portion 120 of the base member 106a of the optical element holding unit 106 are clamped between the first slidable contact surface portions 140a and 140b of the pair of engaging projections 138a and 138b of the carriage 102 and the second slidable contact surface portion 136b of the recess portion 134 of the upper surface of the carriage 102, so that the relative positions of the carriage 102 and the slide portion 120 of the base member 106a of the optical element holding unit 106 are fixedly held with frictional forces generated therebetween. Therefore, the above fine adjustment result is not changed even by removing of the inclination fine adjustment tools 144 from the two inclination adjustment holes 143X and 143Y.

In order to allow the pair of guide rails 100a and 100b to slidably support the carriage 102 as shown in FIG. 8, a pair of slidable contact holes 146a and 146b are formed in the carriage 102 on the two sides of the recess portion 134 in the directions indicated by the arrows Y and Y2, to extend in the tracking directions indicated by the arrows X1 and X2 in which the pair of guide rails 100a and 100b extend, as shown in FIG. 9. The diameter of each of the pair of slidable contact holes 146a and 146b is set to be slightly larger than that of a corresponding one of the pair of guide rails 100a and 100b to reliably ensure smooth slidable contact between the holes and the guide rails inserted therein. In addition, the cross-section of one slidable contact hole 144b corresponding to one guide rail (the guide rail 100b located on the side indicated by the arrow Y2 which is adjacent to the magnetic driving means constituted by the yoke unit 127 of the objective lens focus adjustment member 106b of the optical element holding unit 106 and the focusing and tacking coils 110 and 112 in this embodiment) is set such that the diameter in the directions indicated by the arrows Y1 and Y2 is larger than that in the focusing directions indicated by the arrows Z1 and Z2. Such a structure is employed to absorb a manufacturing dimensional tolerance in the distance between the pair of guide rails 100a and 100b.

Each of the pair of slidable contact holes 146a and 146b in the carriage 102 is divided into two portions by a corresponding one of through holes 148a and 148b which are formed in the carriage 112 at middle portions between two tracking-directional end surfaces of the carriage 102 which faces in the tracking directions indicated by the arrows X1 and X2 to extend through the upper and lower surfaces of the carriage 102 which face upward and downward in the directions indicated by the arrows Z1 and Z2, respectively. The through holes 148a and 148b are formed to reduce weight of the carriage 102.

In this embodiment, another important function of the through hole 148b is to expose the guide rail 100b of the magnetic material, located adjacent to the magnetic driving means of the optical element holding unit 106, to the magnetic driving means, thereby reliably causing a magnetic force generated by the magnetic driving means to act on the guide rail 100b. That is, by urging the carriage 102 supporting the optical element holding unit 106 toward the guide rail 100b with the above magnetic force, the carriage 102 is always pressed against the pair of guide rails 100a and 100b in a predetermined direction with a predetermined uniform force based on the resultant force of the gravitation and the magnetic urging force.

As a result, no rattling is produced in the carriage 102 even if vibrations are externally applied to the optical information recording/reproducing apparatus using the optical system driving apparatus of this embodiment, or something is brought into contact with the optical system driving apparatus while the driving apparatus is sliding along the pair of guide rails 100a and 100b, although there is a small gap between each of the slidable contact holes 146a and 146b and a corresponding one of the guide rails 100a and 100b, as described above.

As shown in FIGS. 8 and 9, a pair of access coils 150a and 150b constituting parts of the magnetic driving means (to be described later) for magnetically moving the carriage 102 along the pair of guide rails 100a and 100b are fixed to two side surfaces of the carriage 102 in the directions indicated by the arrows Y1 and Y2. Extending directions of center lines of the central openings of the access coils 150a and 150b are the same as those of the longitudinal center lines of the pair of guide rails 100a and 100b. The pair of access coils 150a and 150b are electrically connected to the above-described electrical control means (not shown) of the optical information recording/reproducing apparatus via flexible wiring boards (not shown), respectively.

As shown in FIG. 8, a pair of elongated rod-like internal yokes 152a and 152b are respectively inserted in the central openings of the pair of access coils 150a and 150b. The inner yokes 152a and 152b are arranged outside of the pair of guide rails 100a and 100b in the directions indicated by the arrows Y1 and Y2 to extend therealong to be parallel thereto. Length of each of the inner yokes 152a and 152b is set to be larger than the maximum distance in the range in which the carriage 102 moves along the pair of guide rails 100a and 100b. Outer yokes 154a and 154b extending in the same manner as the inner yokes 152a and 152b are arranged at outside of the inner yokes 152a and 152b in the directions indicated by the arrows Y1 and Y2 to be spaced apart from the inner yokes 152a and 152b by predetermined distances, respectively. Two end portions of each of the outer yokes 154a and 154b in the longitudinal directions indicated by the arrows X1 and X2 are directed toward and fixed to two end portions of a corresponding one of the inner yokes 152a and 152b in the longitudinal direction indicated by the arrows X1 and X2.

A pair of elongated rod-like magnets 156a and 156b extending in the same manner as the inner yokes 152a and 152b are fixed to the inner surfaces of the pair of outer yokes 154a and 154b, which face the corresponding inner yokes 152a and 152b.

The pair of magnets 156a and 156b, the pair of outer yokes 154a and 154b, the pair of inner yokes 152a and 152b, and the pair of access coils 150a and 150b constitute the magnetic driving means for magnetically moving the carriage 102 in a desired tracking direction along the pair of guide rails 100a and 100b at a desired speed by controlling currents supplied to the pair of access coils 150a and 150b using the electrical control means (not shown) of the optical information recording/reproducing apparatus which is electrically connected to the pair of access coils 150a and 150b via the flexible wiring board (not shown).

In this embodiment, surfaces of the pair of guide rails 100a and 100b are coated with an ethylene tetrafluoride resin to reduce sliding friction with respect to the carriage 102.

In addition, two end portions of each of the pair of guide rails 100a and 100b in the longitudinal directions indicated by the arrows X1 and X2, the pair of magnets 156a and 156b, the pair of outer yokes 154a and 154b, and the pair of inner yokes 152a and 152b are fixed at predetermined positions on the base deck (not shown) of the optical information recording/reproducing apparatus by a known fixing means.

In the above embodiment, known laser emitting and receiving means (not shown) are arranged at a position where they face the laser reflecting mirror 141 of the carriage 102 on the pair of guide rails 100a and 100b on the base deck (not shown). Therefore, the known laser emitting and receiving means (not shown) can emit a laser beam toward the laser reflecting mirror 141 (i.e., the information recording surface of the above described information recording medium (not shown) through the objective lens 104 of the optical element holding unit 106 on the carriage 102) and can receive a laser beam reflected from the information recording medium through the laser reflecting mirror 142 regardless of the position of the carriage 102 on the pair of guide rails 100a and 100b.

[Second Embodiment]

A structure of a second embodiment of the optical system driving apparatus is almost the same as that of the first embodiment of the optical system driving apparatus of the present invention which has been described in detail above with reference to FIGS. 8 to 15. For this reason, in a following description of the second embodiment of the optical system driving apparatus, the same reference numerals in the second embodiment as those in the second embodiment denote the same parts as those in the first embodiment, and a detailed description thereof will be omitted. Only difference in structure between the first and second embodiments will be described below.

Figure 17:
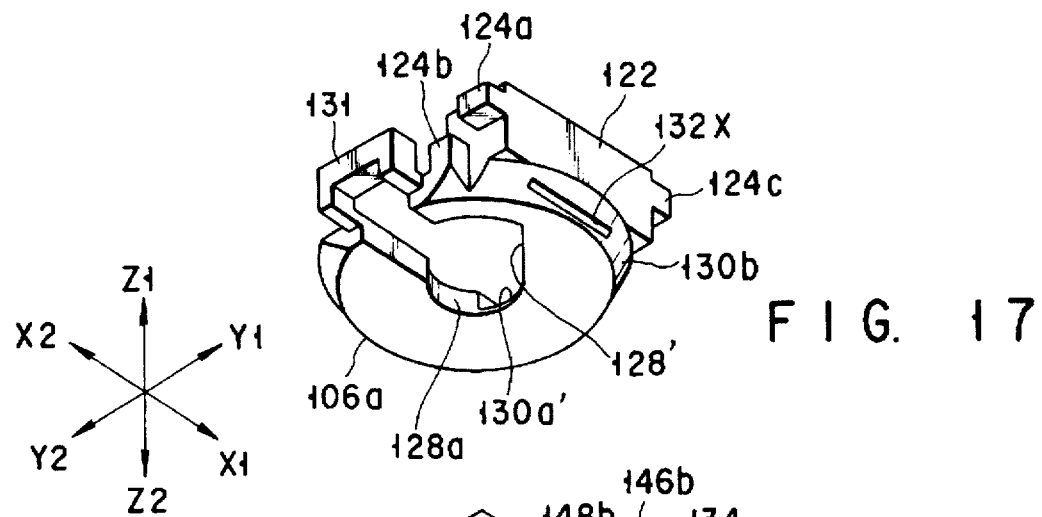
FIG. 17 is a schematic perspective view showing a base member of the optical element holding unit in FIG. 16, when viewed upward obliquely.
Figure 18:
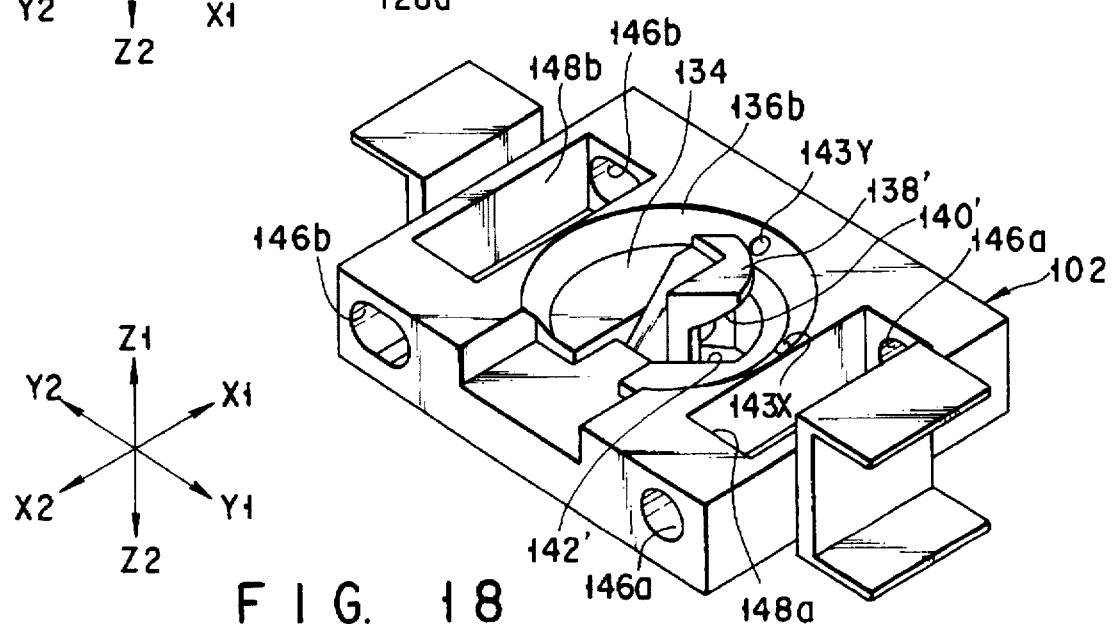
FIG. 18 is a schematic perspective view showing the carriage in FIG. 16, when viewed downward obliquely.
Figure 16:
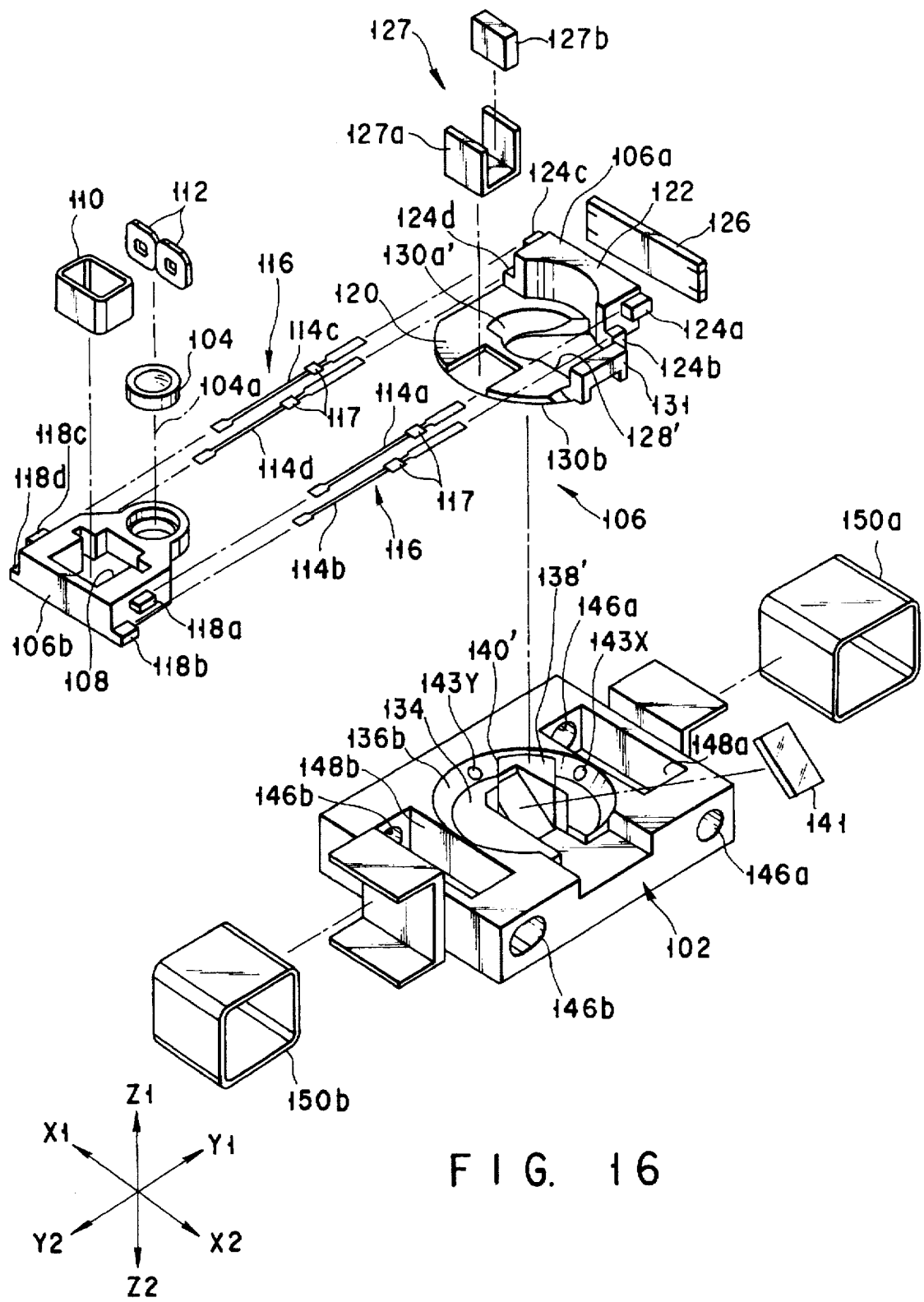
FIG. 16 is a schematic exploded perspective view showing an optical element holding unit and a carriage supporting the unit, which constitute a main part of a second embodiment of the optical system driving apparatus of the present invention, when viewed downward obliquely.

FIG. 16 is an exploded perspective view showing a main part of the second embodiment of the optical system driving apparatus of the present invention. FIG. 17 is a schematic perspective view showing a base member 106a of the optical system driving apparatus in FIG. 16 when viewed from a side surface (a lower surface in FIG. 17; will be referred to as the lower surface hereinafter) of the base member 106a in a direction indicated by an arrow Z2. FIG. 18 is a schematic perspective view showing a carriage 102 of the optical system driving apparatus in FIG. 16 when viewed from an upper surface of the carriage 102 facing upward along a direction indicated by an arrow Z1.

The second embodiment is different from the first embodiment in a structure for slidably engaging a slide portion 120 of the base member 106a of an optical element holding unit 106 in a recess portion 134 of an upper surface of the carriage 102, which faces upward along the direction indicated by the arrow Z1.

More specifically, in the first embodiment, as shown in FIG. 9, the pair of engaging projections 138a and 138b are formed in substantially the center of the bottom surface of the recess portion 134 of the upper surface of the carriage 102. In the second embodiment, however, as shown in FIGS. 16 and 18, only one engaging projection 138' is formed in a center of a recess portion 134. A bent region of an upward protruding end portion of the engaging projection 138' extends in a shape of a sector from substantially a direction indicated by an arrow X1 to substantially a direction indicated by an arrow Y1 on the X–Y plane. A surface of the bent region of the upward protruding end portion of the engaging projection 138', which faces downward along the direction indicated by the arrow Z2, is formed as a first slidable contact surface portion 140' of a first surface of the carriage 102.

The first slidable contact surface portion 140' is also formed into a partly spherical shape whose center coincides with an optical center of an objective lens 104 of an objective lens focus adjustment member 106b supported on the base member 106a in the same manner as in the first embodiment. The first slidable contact surface portion 140' spreads in a shape of a sector from substantially the direction indicated by the arrow X1 to substantially the direction indicated by the arrow Y1 on the X–Y plane.

A first slidable contact surface portion 130a' formed on an upper surface of the slide portion 120 of the base member 106a, which faces upward along the direction indicated by the arrow Z1, along one edge of a light passage hole 128' also spreads in a shape of a sector from substantially the direction indicated by the arrow X1 to substantially the direction indicated by the arrow Y1 on the X–Y plane.

For this reason, the light passage hole 128' extends in substantially an intermediate direction between the directions respectively indicated by the arrows X1 and Y2 on the X–Y plane and in substantially an intermediate direction between the directions respectively indicated by the arrows Y1 and X2 on the X–Y plane. The first slidable contact surface portion 130a' of the slide portion 120 of the base member 106a is formed along one of the pair of long sides of the light passage hole 128' in the manner described above. This first slidable contact surface portion 130a' is also formed into a partly spherical shape whose center coincides with the optical center of the objective lens 104 of the objective lens focus adjustment member 106b.

A distance between a second slidable contact surface portion 136b of the carriage 102 which substantially faces upward along the direction indicated by the arrow Z1, and the first slidable contact surface portion 140' substantially facing downward along the direction indicated by the arrow Z2 to face the second slidable contact surface portion 136b of the carriage 102, is set to be slightly smaller than a thickness between the first and second slidable contact surface portions 130a' and 130b of the first and second surfaces (facing in the opposite directions indicated by the arrows Z1 and Z2) of the slide portion 120 of the base member 106a. A size in a plan view of the bent region of the upward protruding end portion of the engaging projection 138' of the carriage 102, in which the bent region spreads from a proximal end of the engaging projection 138' in the shape of a sector from substantially the direction indicated by the arrow X1 to substantially the direction indicated by the arrow Y1 on the X–Y plane, is set to be smaller than a size in the X–Y plane of the light passage hole 128' of the slide portion 120 of the base member 106a. And a length of a diagonal line on the proximal end is set to be shorter than a diameter of a partly circular portion 12a of the light passage hole 128' corresponding to a peripheral of the proximal end of the engaging projection 138'.

A through hole 142' is formed in a region of the bottom surface of the recess portion 134 being adjacent to the proximal end of the engaging projection 138' to extend to the lower surface of the carriage 102 which faces downward along the direction indicated by the arrow Z2, and spreads in a shape of a sector from substantially the direction indicated by the arrow X1 to substantially the direction indicated by the arrow Y1 on the X–Y plane. The through hole 142' allows use of a separable mold (not shown), which can be separated into halves in a vertical direction indicated by the arrows Z1 and Z2, so that the engaging projection 138' having the upward protruding end portion which spreads in the shape of a sector as described, is formed simultaneously with the remaining portion of the carriage 102 by using same material when injection molding of the carriage 102 is performed.

In this embodiment, when the slide portion 120 of the base member 106a is to be slidably engaged with the engaging projection 138' while the slide portion 120 is seated in the recess portion 134 of the carriage 102, the engaging projection 138' is inserted in the light passage hole 128' while a direction in which the bent region of the upward protruding end portion of the engaging projection 138' projects coincides with the longitudinal direction of the light passage hole 128' in the slide portion 120 of the base member 106a of the optical element holding unit 106. The base member 106a is then lowered until the second slidable contact surface portion 130b of the slide portion 120 of the base member 106a comes into contact with the second slidable contact surface portion 136b (FIG. 10) of the upper surface of the carriage 102. In this case, the bent region of the upward protruding end portion of the single engaging projection 138' protrudes upward from an opening of the light passage hole 128' in the upper surface of the base member 106a of the optical element holding unit 106.

Subsequently, by rotating the base member 106a, the first slidable contact surface portion 140' facing downward indicated by the arrow Z2 in the bent region of the upward protruding end portion of the single engaging projection 138' of the upper surface of the carriage 102 rides on the first slidable contact surface portion 130a' extending along one of the two long sides of the light passage hole 128' in the base member 106a of the optical element holding unit 106.

As described above, the distance between the second slidable contact surface portion 136b and the first slidable contact surface portion 140' of the carriage 102 is set to be slightly smaller than the distance between the second slidable contact surface portion 130b and the first slidable contact surface portion 130a' of the slide portion 120 of the base member 106a of the optical element holding unit 106. In addition, the single engaging projection 138' of the carriage 102 is made of a material having good sliding characteristics, e.g., polyphenylene sulfide resin, together with the remaining portion of the carriage 102, and is slightly elastic. Therefore, the slide portion 120 of the base member 106a of the optical element holding unit 106 is clamped at its first and second slidable contact surface portions 130a' and 130b by the first slidable contact surface portion 140' of the single engaging projection 138' of the carriage 102 and the second slidable contact surface portion 136b of the recess portion 134 of the upper surface of the carriage 102, and is slidable along these partly spherical portions.

That is, the slide portion 120 of the base member 106a of the optical element holding unit 106 can be inclined at a desired angle with respect to the center of the objective lens 104 in a desired direction within a predetermined range with respect to the carriage 102. Hence, the optical axis 104a (FIG. 16) of the objective lens 104 as an optical element held by the optical element holding unit 106 can be inclined at a desired angle in a desired direction within a predetermined range.

Therefore, in a production line of an optical information recording/reproducing apparatus using the second embodiment of the optical system driving apparatus of the present invention, the optical axis 104a of the objective lens 104 can be finely adjusted to be perpendicular to the above-mentioned information recording surface of the disk-like information recording medium (not shown) arranged at a predetermined position in the optical information recording/reproducing apparatus.

The inclination fine adjustment tool 144 shown in FIG. 14 is used for the above-mentioned fine adjustment.

In this embodiment, although the carriage 102 has the single engaging projection 138', the first slidable contact surface portion 140' of the engaging projection 138' spreads in the shape of a sector and has a relatively large area, as described above. In addition, the second slidable contact surface portion 130b of the lower surface of the slide portion 120 and the second slidable contact surface portion 136b of the recess portion 134 of the upper surface of the carriage 102 are kept in contact with each other via relatively large areas while the slide portion 120 of the base member 106a of the optical element holding unit 106 is member in the recess portion 134 of the upper surface of the carriage 102. Therefore, the optical element holding unit 106 held by the carriage 102 in the above manner generates no vibrations while the carriage 102 is moving along the pair of guide rails 100a and 100b (FIG. 8), and does not resonate with ordinary vibrations externally applied to the optical information recording/reproducing apparatus.

In the second embodiment described in detail above, the carriage 102 has the single engaging projection 138', and the slide portion 120 of the base member 106a of the optical element holding unit 106 also has the single first slidable contact surface portion 130a' corresponding to the first slidable contact surface portion 140' of the single engaging projection 138'. Therefore, size of the slide portion 120 in the directions indicated by the arrows Y1 and Y2 in FIG. 16 can be reduced as compared with the slide portion 120 in the first embodiment described above. As a result, size of the objective lens focus adjustment member 106b supported on the base member 106a in the directions indicated by the arrows Y1 and Y2 in FIG. 16 can also be reduced as compared with the slide portion 120 in the first embodiment. In addition, weight of the optical element holding unit 106 can be reduced as compared with the first embodiment. Furthermore, moving speed of the carriage 102 on the pair of guide rails 100a and 100b (FIG. 8) can be increased as compared with the first embodiment.

[Third Embodiment]

Figure 19:
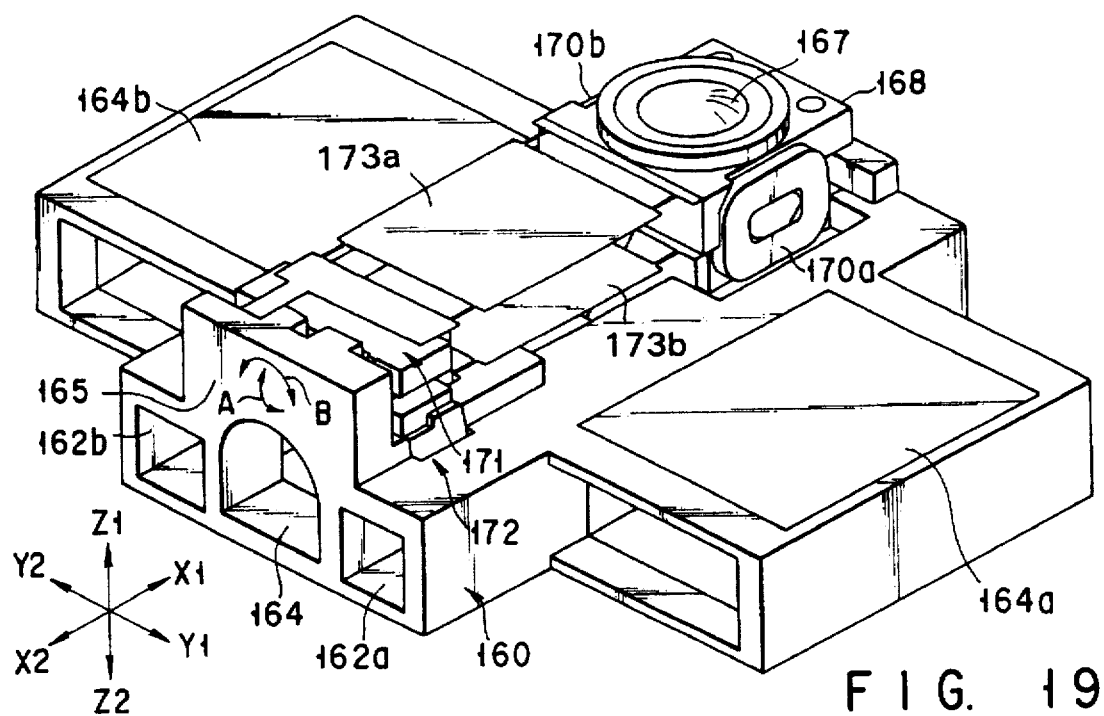
FIG. 19 is a schematic perspective view showing a main part of a third embodiment of the optical system driving apparatus of the present invention, when viewed downward obliquely.
Figure 20:
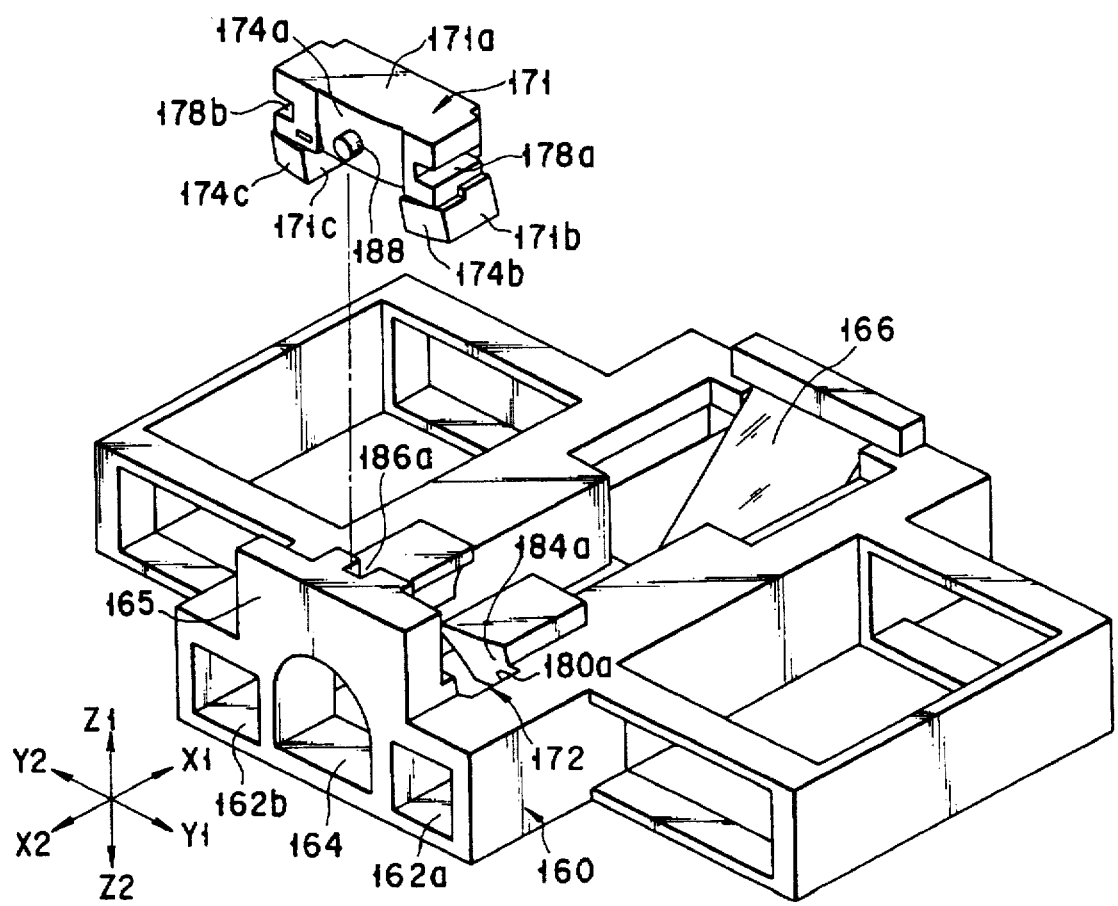
FIG. 20 is a schematic exploded perspective view showing a base block of the optical element holding unit and a carriage supporting the unit, which constitute the main part of the optical system driving apparatus in FIG. 19, when viewed from an oblique upper front side of the main part.
Figure 21:
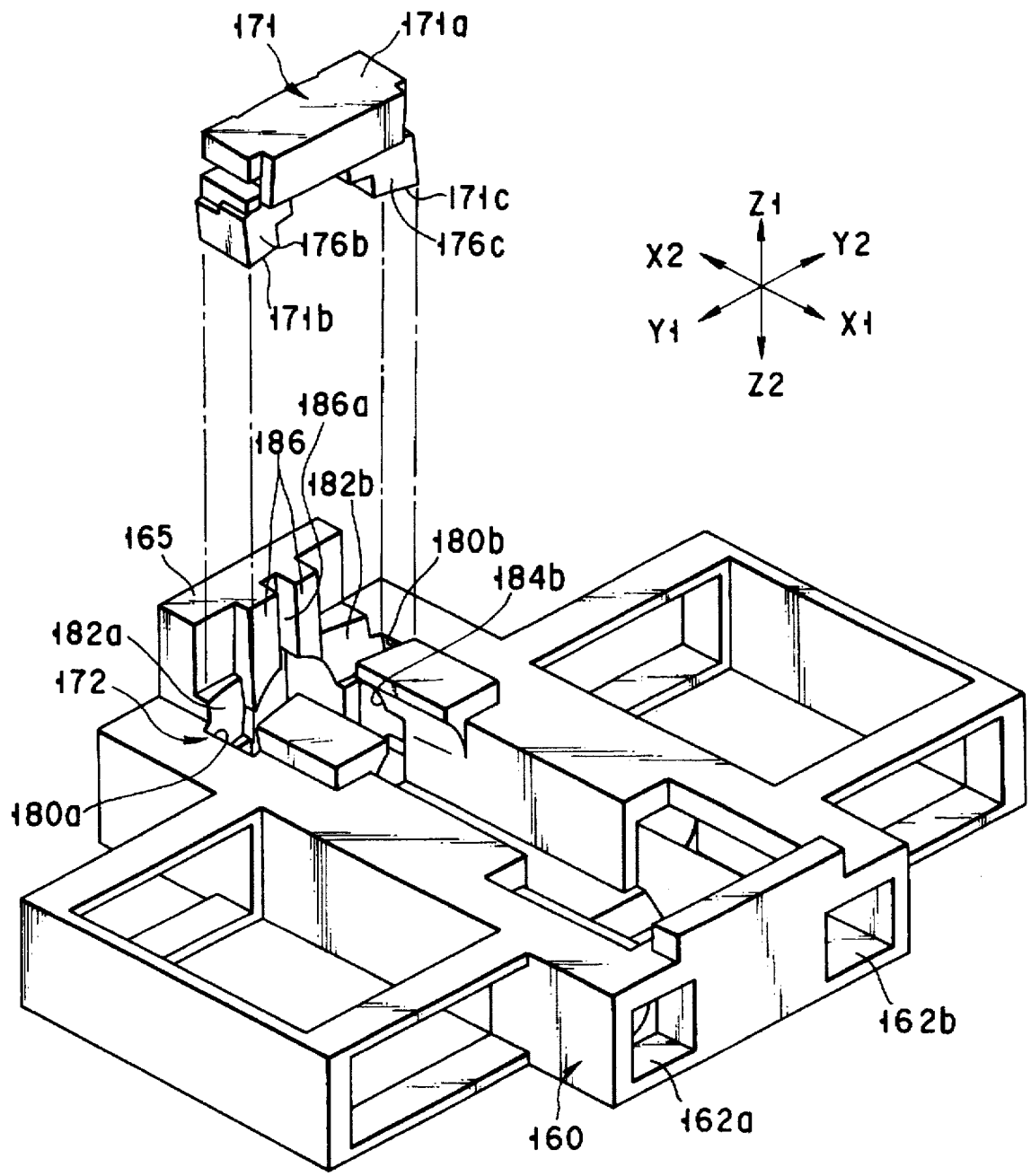
FIG. 21 is a schematic exploded perspective view showing the base block of the optical element holding unit and the carriage supporting the unit, which constitute the main part of the optical system driving apparatus in FIG. 19, when viewed from an oblique upper rear side of the main part.

FIG. 19 shows a perspective view of a main part of a third embodiment of the optical system driving apparatus of the present invention. FIG. 20 shows an exploded perspective view in which a base member of an optical element holding unit is separated from a carriage of the optical system driving apparatus in FIG. 19, when viewed from an oblique upper front side of the carriage. FIG. 21 shows an exploded perspective view in which the base member of the optical element holding unit is separated from the carriage of the optical system driving apparatus in FIG. 19, when viewed from an oblique upper rear side of the carriage.

In this embodiment, a carriage 160 has a pair of sliding bearing holes 162a and 162b which are slidably supported on a pair of guide rails (not shown) extending in tracking directions indicated by arrows X1 and X2. In this embodiment, the carriage 160 is also made of a material having good sliding characteristics, e.g., polyphenylene sulfide. The carriage 160 holds a pair of access coils 164a and 164b at outsides of the pair of sliding bearing holes 162a and 162b in directions indicated by arrows Y1 and Y2. A function of the pair of access coils 164a and 164b is the same as that of the pair of access coils 150a and 150b in the first and second embodiments. The access coils 164a and 164b, together with a pair of elongated magnets and a pair of elongated yokes which extend along the pair of guide rails (not shown) to be parallel thereto, constitute a known magnetic driving means for moving the carriage 160 along the pair of guide rails in a desired direction at a desired speed with a magnetic force.

In the carriage 160, a light passage groove 164 is formed between the pair of sliding bearing holes 162a and 162b to extend therealong and be parallel thereto. As shown in FIG. 20, the light passage groove 164 has an opening in one end surface of the carriage 160 which faces a direction indicated by an arrow X2, and extends to a portion near the other end surface of the carriage 160 which faces in a direction indicated by an arrow X1. Furthermore, in order to facilitate a manufacturing process and reduce weight of the carriage 160, the light passage groove 164 also has an opening in an upper surface of the carriage 160 which faces upward along a direction indicated by an arrow Z1. Note that an end portion of the opening in the upper surface located in the direction indicated by the arrow X2 is covered with a bridge-like portion 165 protruding upward from an upper surface of the end portion. The bridge-like portion 165 prevents the carriage 160 from lowering its rigidity caused by the opening of the light passage groove 164 in the upper surface of the carriage 160.

A laser beam reflecting mirror 166 is arranged in the light passage groove 164 at its end portion located in the direction indicated by the arrow X1 to face an intermediate direction between the directions indicated by the arrows Z1 and X2, respectively, (i.e., a direction inclined from the direction indicated by the arrow X2 to the direction indicated by the arrow Z1 by about 45°).

An objective lens focus adjustment member 168 holding an objective lens 167 as an optical element is arranged above the laser beam reflecting mirror 166 in the direction indicated by the arrow Z1, in the opening of the light passage groove 164 in the upper surface of the carriage 160. An optical axis of the objective lens 166 of the objective lens focus adjustment member 168 extends in vertical directions indicated by the arrows Z1 and Z2, and focus coils 170a and 170b are mounted on two side surfaces of the objective lens focus adjustment member 168 in the directions indicated by the arrows Y1 and Y2, respectively. In this embodiment, the above known magnetic driving means including the pair of access coils 150a and 150b further includes a magnetic circuit (not shown) for generating a large magnetic field in the vertical directions (i.e., the focusing directions) indicated by the arrows Z1 and Z2. This magnetic circuit and the focus coils 170a and 170b constitute a known magnetic driving means for moving the objective lens focus adjustment member 168 in the vertical directions (i.e., the focusing directions) indicated by the arrows Z1 and Z2.

A base block slide portion 172 in which a base block 171 is slidably fitted is formed in the opening of the light passage groove 164 in the upper surface of the carriage 160 at a position adjacent to the bridge-like portion 165.

As clearly shown in FIGS. 20 and 21, the base block 171 has a substantially square base body 171a and a pair of leg portions 171b and 171c protruding downward from two end portions of a lower surface (facing downward along a direction indicated by the arrow Z2) of the base body 171a, located in the directions respectively indicated by the arrows Y1 and Y2.

As shown in FIG. 19, the base block 171 and the objective lens focus adjustment member 168 are arranged above the opening of the light passage groove 164 in the upper surface of the carriage 160 to be parallel to the upper surface, and are coupled to each other via two leaf springs 173a and 173b separated from each other in the vertical directions (i.e., the focusing directions) indicated by the arrows Z1 and Z2 by a predetermined distance. The objective lens focus adjustment member 168 is supported above the laser beam reflecting mirror 166 of the carriage 160 in the direction indicated by the arrow Z1 via the two leaf springs 173a and 173b and the base seat block 171.

As shown in FIG. 20, three second slidable contact surface portions 174a, 174b, and 174c, each having a partly spherical shape whose center coincides with a center of the objective lens 167 of the objective lens focus adjustment member 168, are respectively formed on a central portion of a surface region of the base body 171a of the base block 171, which faces in the direction indicated by the arrow X2, and on surface regions of the pair of leg portions 171b and 171c, which face in the direction indicated by the arrow X2. Radius of the second slidable contact surface portion 174a is smaller than that of each of the second slidable contact surface portions 174b, 174c of the pair of by portions 171b and 171c.

As shown in FIG. 21, first slidable contact surface portions 176a and 176b, each having a partly spherical shape whose center coincides with the center of the objective lens 167 of the objective lens focus adjustment member 168, are formed on surface regions of the pair of leg portions 171b and 171c of the base block 171, which face in the direction indicated by the arrow X1.

Furthermore, as best shown in FIG. 20, inclination adjustment grooves 178a and 178b extending in the tracking directions indicated by the arrows X1 and X2 are formed in two side surfaces of the base body 171a of the base block 171, which face in the directions respectively indicated by the arrows Y1 and Y2.

As best shown in FIG. 21, the base block slide portion 172 formed in the opening of the light passage groove 164 in the upper surface of the carriage 160 to be adjacent to the bridge-like portion 165 has a pair of fitting recess portions 180a and 180b, in which the pair of leg portions 171b and 171c of the base block 171 are slidably fitted, at positions adjacent to the light passage groove 164 in the two directions respectively indicated by the arrows Y1 and Y2.

As shown in FIG. 21, regions of inner surfaces of the pair of fitting recess portions 180a and 180b, which respectively correspond to the second slidable contact surface portions 174b and 174c of the pair of leg portions 171b and 171c of the base block 171 are also formed as second slidable contact surface portions 182a and 182b, each having a partly spherical shape whose center coincides with the center of the objective lens 167 of the objective lens focus adjustment member 168. Radius of each of the former second slidable contact surfaces 174b, 174c is the same as that of each of the latter second slidable contact surfaces 182a, 182b.

In addition, as shown in FIGS. 20 and 21, regions of the inner surfaces of the pair of fitting recess portions 180a and 180b, which respectively correspond to the first slidable contact surface portions 176b and 176c of the pair of leg portions 171b and 171c of the base block 171 are formed as first slidable contact surface portions 184a and 184b, each having a partly spherical shape whose center coincides with the center of the objective lens 167 of the objective lens focus adjustment member 168. Radius of each of the former first slidable contact surface portions 176b, 176c is the same as that of each of the latter first slidable contact surface portions 184a, 184b.

A side surface of the bridge-like portion 165 on the upper surface of the carriage 160 which faces in the direction indicated by the arrow X1, faces the second slidable contact surface portion 174a of the base body 171a of the base block 171 when the pair of leg portions 171b and 171c of the base block 171 are fitted along the direction indicated by the arrow Z2 in the pair of fitting recess portions 180a and 180b of the base block slide portion 172 of the carriage 160 in the manner shown in FIG. 19. Another second slidable contact surface portion 186 having a partly spherical shape whose center coincides with the center of the objective lens 167 of the objective lens focus adjustment member 168, is formed on the above described side surface of the bridge-like portion 165, as shown in FIG. 21. The second slidable contact surface portion 186 of the bridge-like portion 165 of the carriage 160 is brought into slidable contact with the second slidable contact surface portion 174a of the base body 171a of the base block 171. Radius of the former second slidable contact surface portion 186 is substantially the same as that of the latter second slidable contact surface portion 174a.

A positioning groove 186a is formed in the second slidable contact surface portion 186 of the bridge-like portion 165 of the carriage 160 at substantially a central position in the directions respectively indicated by the arrows Y1 and Y2 to extend in the vertical directions indicated by the arrows Z1 and Z2. As shown in FIG. 20, a positioning projection 188 is formed on the second slidable contact surface portion 174a of the base body 171a of the base block 171 at substantially a center in the vertical directions indicated by the arrows Z1 and Z2 and the directions respectively indicated by the arrows Y1 and Y2. Diameter and projecting length of the positioning projection 188 are little smaller than width in the directions indicated by the arrows Y1 and Y2 and depth in the directions indicated by the arrows X1 and X2 in the positioning groove 186a.

As shown in FIG. 19, the pair of leg portions 171b and 171c of the base block 171 are fitted along the direction indicated by the arrow Z2 in the pair of fitting recess portions 180a and 180b of the base block slide portion 172 of the carriage 160, and the second slidable contact surface portion 186 of the bridge-like portion 165 of the carriage 160 slidably faces the second slidable contact surface portion 174a of the base body 171a of the base block 171. At this time, the positioning projection 188 of the second slidable contact surface portion 174a of the base body 171a of the base block 171 is inserted along the direction indicated by the arrow Z2 in the positioning groove 186a of the second slidable contact surface portion 186 of the bridge-like portion 165 of the carriage 160.

In the pair of fitting recess portions 180a and 180b of the base block slide portion 172 of the carriage 160, the pair of leg portions 171b and 171c of the base block 171 is clamped at its first and second slidable contact surface portions 176b and 176c, and 174b and 174c between the corresponding first and second slidable contact surface portions 184a and 184b, and 182a and 182b of the pair of fitting recess portions 180a and 180b with the elasticity of the material for the carriage 160, but are slidable with respect to each other.

In the second embodiment having the above arrangement, for example the eccentric pin 144b of the inclination fine adjustment tool 144 shown in FIG. 14 is inserted in each of the inclination adjustment grooves 178a and 178b of the base body 171a of the base block 171, which face the directions respectively indicated by the arrows Y1 and Y2. By rotating these two inclination fine adjustment tools 144, the base block 171 can be moved in the vertical direction indicated by the arrows Z1 and Z2, around Y-axis indicated by the arrows Y1 and Y2, within a predetermined range, as indicated by an arrow A in FIG. 19. As a result, the optical axis of the objective lens 167 of the objective lens focus adjustment member 168 supported on the base block 171 by the two leaf springs 174a and 174b is swung about the center of the objective lens 167 in the tracking directions indicated by the arrows X1 and X2, within a predetermined range around the Y-axis indicated by the arrows Y1 and Y2.

In addition, by rotating the inclination fine adjustment tools 144 to move the inclination adjustment grooves 178a, 178b in the opposite directions indicated by the arrows Z1 and Z2, the base block 171 can be rotated around an X-axis indicated by the arrows X1 and X2, within a predetermined range, as indicated by an arrow B in FIG. 19. As a result, the optical axis of the objective lens 166 of the objective lens focus adjustment member 168 supported on the base block 171 by the two leaf springs 174a and 174b is swung in the tangential directions indicated by the arrows Y1 and Y2 within a predetermined range around the X-axis indicated by the arrows X1 and X2.

The optical axis of the objective lens 166 of the objective lens focus adjustment member 168 can be set in a desired direction at a desired angle within the range of a cone having a predetermined interior angle and centered on the center of the objective lens 166 by adjusting the rotational angles of the two inclination fine adjustment tools 144 inserted in the two inclination adjustment grooves 178a and 178b in the two side surfaces of the base body 171a of the base block 171.

In the third embodiment described above, the objective lens focus adjustment member 168, the two leaf springs 174a and 174b, and the base block 171 constitute the optical element holding unit which is integrally slidable with respect to the carriage 160.

After the optical axis of the objective lens 166 of the objective lens focus adjustment member 168 is finely adjusted in the above-described manner, the eccentric pins 144b of the inclination fine adjustment tools 144 are respectively removed from the inclination adjustment grooves 178a and 178b in the two side surfaces of the base body 171a of the base block 171, and the base block 171 and the carriage 160 are fixed to each other at the base block slide portion 172 by a known fixing means such as an adhesive.

In this embodiment, from time when the above described fine adjustment is completed to time when the base block 171 and the carriage 160 are fixed to each other by a known fixing means such as an adhesive, the pair of leg portions 171b and 171c of the base block 171 are clamped between the first and second slidable contact surface portions 184a and 184b, and 182a and 182b of the carriage 160, in the pair of fitting recess portions 180a and 180b of the base block slide portion 172 of the carriage 160, with the elasticity of the material for the carriage 160, so that the relative positions of the carriage 160 and the base block 171 are reliably held with frictional forces generated between the slidable contact surfaces. Therefore, the above fine adjustment result is not changed when the eccentric pins 144b of the inclination fine adjustment tools 144 are respectively removed from the two inclination adjustment grooves 178a and 178b in the two side surfaces of the base body 171a of the base block 171. In this embodiment, the positioning projection 188 of the base block 171 engages with the positioning groove 186a of the bridge portion 165 of the carriage 160, the base block 171 can not rotate around a Z-axis indicated by the arrows Z1 and Z2.

In each of the optical system driving apparatus according to the first to third embodiments of the present invention which have been described in detail above with reference to FIGS. 8 to 21, the first slidable contact surface portion 140a, 140b, 140', or 184a, 184b of the carriage 102 or 160 and the first slidable contact surface portion 130a, 130a', or 176a, 176b of the first surface of the base member 106a or the base block 171, which is brought into slidable contact with the first slidable contact surface portion 140a, 140b, 140', or 184a, 184b are formed into partly spherical shapes, each having the center coinciding with the center of the objective lens 104 or 166. However, only one of the first slidable contact surface portions 140a, 140b, 140', and 184a, 184b of the first surfaces of the carriages 102 and 160 or one of the first slidable contact surface portions 130a, 130a', and 176a, 176b of the first surfaces of the base member 106a of the optical element holding unit 106 and the base block 171 which are brought into slidable contact with the first slidable contact surface portions 140a, 140b, 140', and 184a, 184b may be formed into the above-described partly spherical shape, while a corresponding one of the remaining slidable contact surface portions may have any outer shape as long as it has a structure designed to support the first slidable surface contact portion having the partly spherical shape so as to allow it to slide in an arbitrary circumferential direction of the spherical shape. As such a structure, for example, there is provided a columnar structure which is brought into substantially linear contact with a corresponding first slidable contact surface portion having a partly spherical shape, or a structure having a plurality of projections which are brought into contact with a corresponding first slidable contact surface having a partly spherical shape at three or more points.

The same applies to the second slidable contact surface portion 136b, or 182a, 182b, 186 of the second surface of the carriage 102 or 160 and the second slidable contact surface portion 130b, or 174b, 174c, 174a of the second surface of the base member 106a of the optical element holding unit 106 or the base block 171 which is brought into slidable contact with the second slidable contact surface portion 136b, or 182a, 182b, 186. That is, any one of the second slidable contact surface portions may be formed into a partly spherical shape, while a corresponding one of the remaining second slidable contact surface portions may have any outer shape as long as it has a structure designed to support the second slidable contact surface portion having the partly spherical shape so as to allow it to slide in an arbitrary circumferential direction of the spherical shape. As such a structure, for example, there is provided a columnar structure which is brought into substantially linear contact with a corresponding second slidable contact surface portion having a partly spherical shape, or a structure having a plurality of projections which are brought into contact with a corresponding second slidable contact surface having a partly spherical shape at three or more points.

Further, the slidable connection of the base member 106a or the base block 171 to the carriage 102 or 160 can be achieved not only by a forcible fitting as in the above described various embodiments but also by a minute loose fitting.

[Fourth Embodiment]

A fourth embodiment of the optical system driving apparatus of the present invention will be described in detail below with reference to FIGS. 22 to 25.

Figure 22:
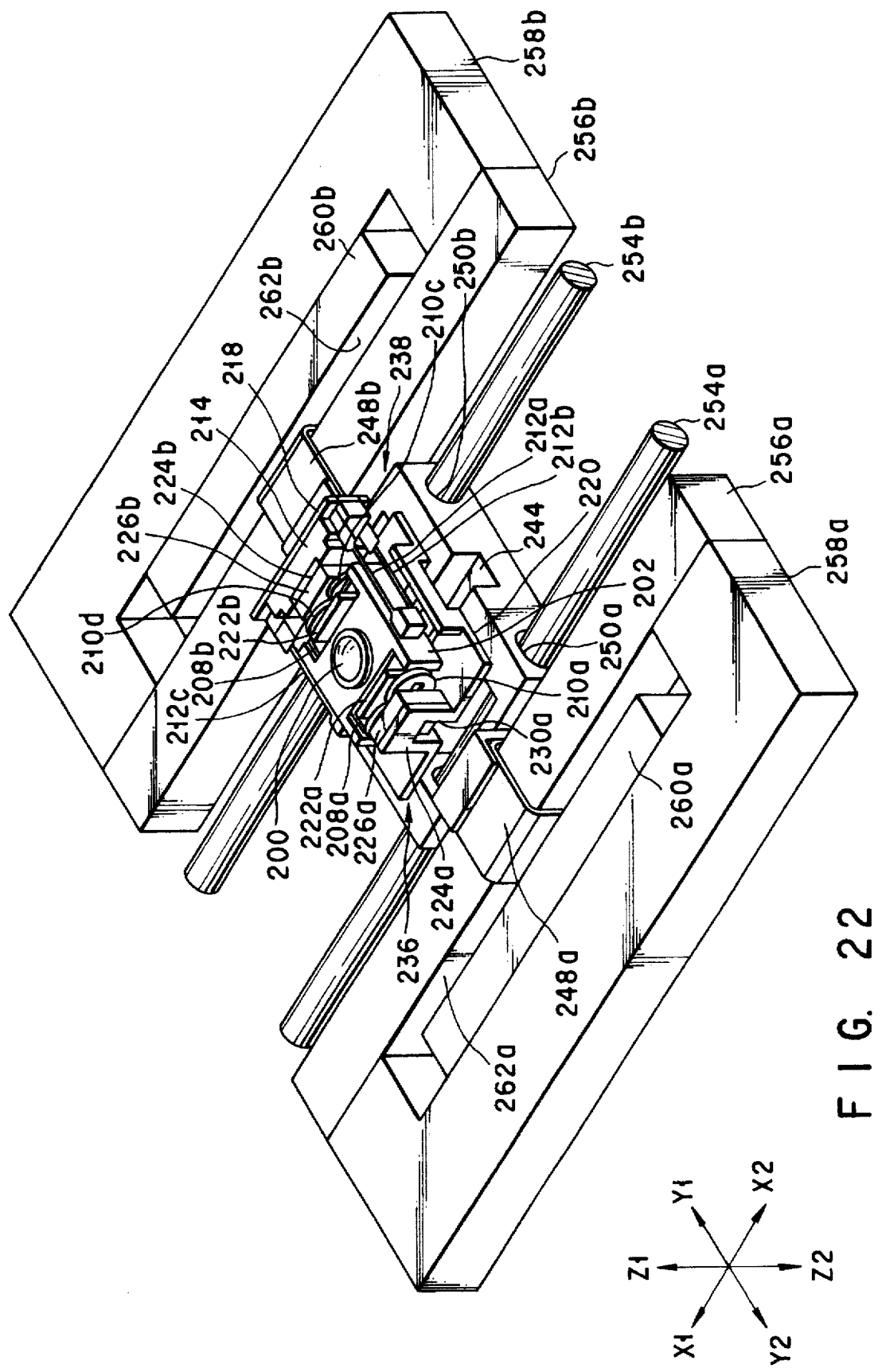
FIG. 22 is a schematic perspective view showing a main part of a fourth embodiment of the optical system driving apparatus of the present invention, when viewed downward obliquely.
Figure 23:
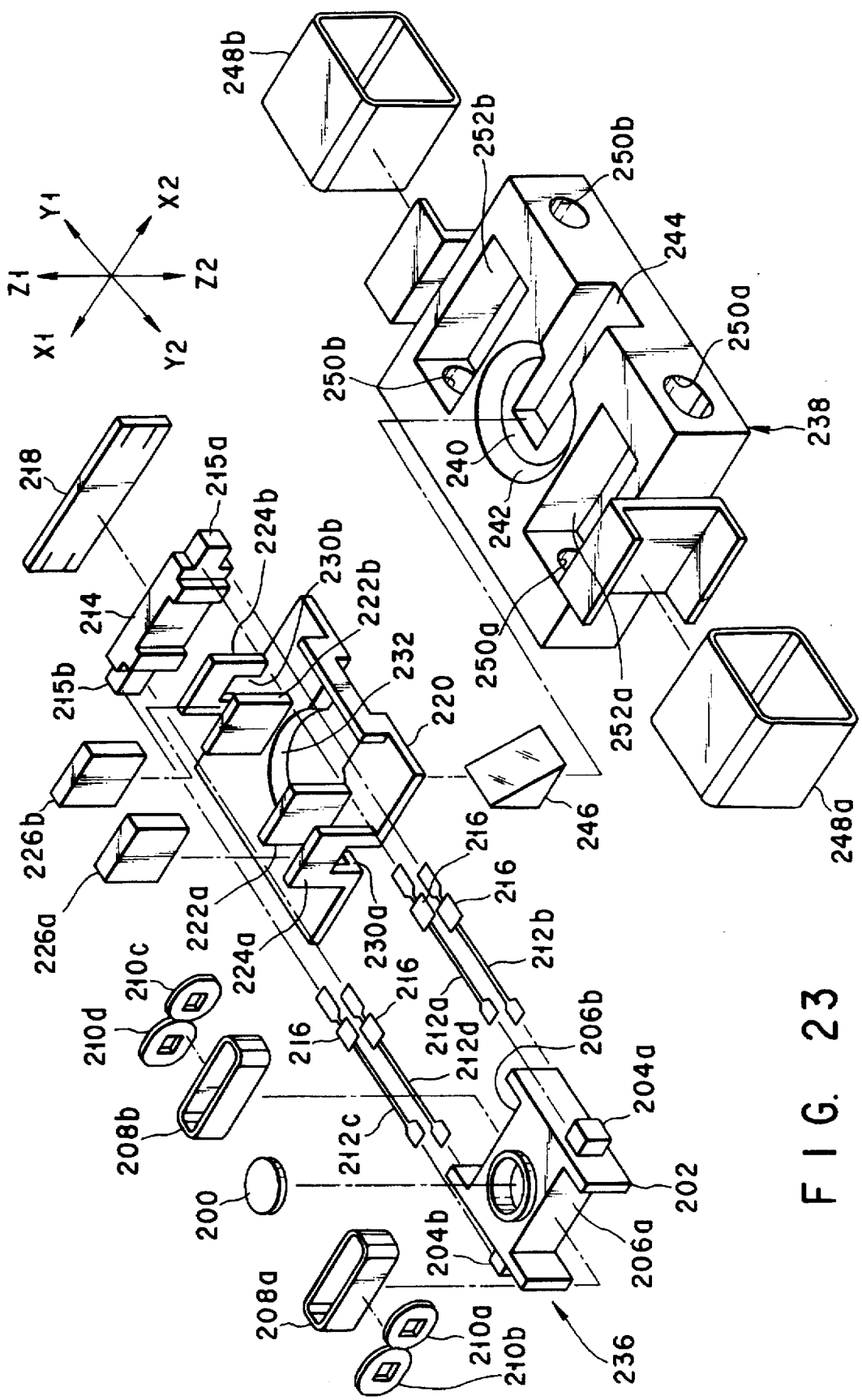
FIG. 23 is a schematic exploded perspective view showing an optical element holding unit and a carriage supporting the unit, which constitute the main part of the optical system driving apparatus in FIG. 22, when viewed downward obliquely.

Referring to FIG. 22, reference numeral 200 denotes an objective lens as an optical element. The objective lens 200 is fixed to an upper portion of an objective lens focus adjustment member 202 having a substantially box-like shape. As shown in FIG. 23, projections 204a and 204b are respectively formed on two side surfaces of the objective lens focus adjustment member 202, which face in two directions (tracking directions) indicated by arrows X2 and X1. Recess portions 206a and 206b are formed in the two remaining side surfaces of the objective lens focus adjustment member 202, which face in two directions indicated by arrows Y2 and Y1.

Focus coils 208a and 208b are respectively fixed in the recess portions 206a and 206b, and central openings of the focus coils 208a and 208b are set to face in the directions (focusing directions) indicated by arrows Z1 and Z2. Two pairs of tracking coils 210a and 210b, and 210c and 210d are respectively fixed to two side surfaces of the focus coils 208a and 208b, which face in directions indicated by the arrows Y1 and Y2, with central openings of the two pairs of tracking coils respectively facing in the directions indicated by the arrows Y1 and Y2.

One end portion of each of two pairs of leaf springs 212a and 212b, and 212c and 212d is fixed to a corresponding one of upper and lower surfaces of the projections 204a and 204b of the objective lens focus adjustment member 202, the upper and lower surface facing upward and downward along the directions indicated by the arrows Z1 and Z2. Each pair of leaf springs respectively extend in the directions indicated by the arrows Y1 and Y2 and are separated from each other by a predetermined distance in the vertical direction indicated by the arrows Z1 and Z2. The other end portion of each of the four leaf springs 212a, 212b, 212c, and 212d is fixed to a corresponding one of upper and lower surfaces of projections 215a and 215b, the upper and lower surfaces facing upward and downward along the directions indicated by the arrows Z1 and Z2. The projections 215a and 215b are formed on two side surfaces of a spring bearing member 214, which face in the two directions (tracking directions) indicated by the arrows X2 and X1, respectively.

With these leaf springs 212a, 212b, 212c, and 212d, the objective lens focus adjustment member 202 can be freely movable with respect to the spring bearing member 214 in the directions (tracking directions) indicted by the arrows X2 and X1 and the directions (focusing directions) indicated by the arrows Z1 and Z2 within a predetermined range.

An anti-vibration member 216 constituted by a viscoelastic member covered with an aluminum foil or the like is fixed to each of the leaf springs 212a, 212b, 212c, and 212d to restrict vibrations. The four leaf springs 212a, 212b, 212c, and 212d are electrically connected to the focus coils 208a and 208b and the tracking coils 210a, 210b, 210c, and 210d.

A circuit board 218 is fixed to a side surface of the spring bearing member 214, which faces in the direction indicated by the arrow Y1. The other end portion of each of the four leaf springs 212a, 212b, 212c, and 212d is electrically connected to a wiring pattern on the circuit board 218. The circuit board 218 is electrically connected to an electric circuit (not shown) of an optical information recording/reproducing apparatus using the optical system driving apparatus of this embodiment via a flexible wiring board (not shown). With this structure, the focus coils 208a and 208b and the tracking coils 210a, 210b, 210c, and 210d are electrically connected to the electric circuit.

A base member 220 made of a magnetic material is arranged below (in the direction indicated by the arrow Z2) the objective lens focus adjustment member 202 and the spring bearing member 214, which are coupled to each other via the four leaf springs 212a, 212b, 212c, and 212d. One pair of first inner and outer yokes 222a and 224a or another pair of second inner and outer yokes 222b and 224b respectively extend upward from two end portions (located in the directions indicated by the arrows Y1 and Y2) on an upper surface (facing upward along the direction indicated by the arrow Z1) of the base member 220.

The spring bearing member 214 is fixed by a known fixing means such as a screw to a side surface of the second outer yoke 224b located in the direction indicated by the arrow Y1, which faces in the direction indicated by the arrow Y1. The first and second inner yokes 222a and 222b respectively located in the directions indicated by the arrows Y2 and Y1 are inserted in the central openings of the two focus coils 208a and 208b of the objective lens focus adjustment member 202.

First and second magnets 226a and 226b are respectively fixed to inner surfaces of the first and second outer yokes 224a and 224b, which face the corresponding first and second inner yokes 222a and 222b. Predetermined gaps are respectively formed between the first magnet 226a and the first inner yoke 222a and between the second magnet 226b and the second inner yoke 222b.

Since the base member 220 is made of a magnetic material, the first magnetic circuit is constituted by the first inner and outer yokes 222a and 224a and the first magnet 226a, and the second magnetic circuit is constituted by the second inner and outer yokes 222b and 224b and the second magnet 226b. The above gaps between the first magnet 226a and the first inner yoke and between the second magnet 226b and the second inner yoke 222b serve as magnetic gaps 228a and 228b (FIG. 24), respectively. Side wall regions of the focus coils 208a and 208b, to which the two pairs of tracking coils 210a and 210b, and 210c and 210d are respectively fixed, are arranged in the corresponding magnetic gaps 228b (FIG. 24) together with the tracking coils 210a, 210b, 210c, and 210d.

These combinations of the first inner and outer yokes 222a and 224a, second inner and outer yokes 222b and 224b, and first and second magnets 226a and 226b of the base member 220, and the two focus coils 208a and 208b and four tracking coils 210a, 210b, 210c, and 210d of the objective lens focus adjustment member 202 constitute a magnetic driving means for moving the optical axis of the objective lens 200 of the objective lens focus adjustment member 202 by small distances in the tracking directions indicated by the arrows X1 and X2 and the focusing directions indicated by the arrows Z1 and Z2 with magnetic forces.

Openings 230a and 230b are respectively formed in proximal end portions of the first and second outer yokes 224a and 224b of this magnetic driving means to extend into the base member 220.

A light beam passage hole 232 is formed in the base member 220 at a position between the first and second inner yokes 222a and 222b to extend between the upper surface facing upward along the direction indicated by the arrow Z1 and the lower surface facing downward along the direction indicated by the arrow Z2.

A spherical surface slidable contact portion 234 (FIG. 24) is formed on the lower surface of the base member 220 to extend annularly around the light beam passage hole 232. A surface of the spherical surface slidable contact portion 234 is constituted by a part of a spherical surface which has a center coinciding with the center of the objective lens 200 of the objective lens focus adjustment member 202.

In this embodiment, a unit constituted by the base member 220 and various members mounted on the base member 220 in the above-described manner is referred to as an optical element holding unit, which is denoted by reference numeral 236.

The spherical surface slidable contact portion 234 on the lower surface of the base member 220 is seated in a recess portion 240 formed in substantially a center of an upper surface of a synthetic resin carriage 238, which faces upward along the direction indicated by the arrow Z1. A spherical surface slidable contact portion 242 is also formed in the recess portion 240 of the carriage 238 to extend in an annular shape in correspondence with the spherical surface slidable contact portion 234 on the lower surface of the base member 220. In addition, a surface of the spherical surface slidable contact portion 242 of the carriage 238 is constituted by a part of a spherical surface which has a center coinciding with the center of the objective lens 200 of the objective lens focus adjustment member 202.

Figure 24:
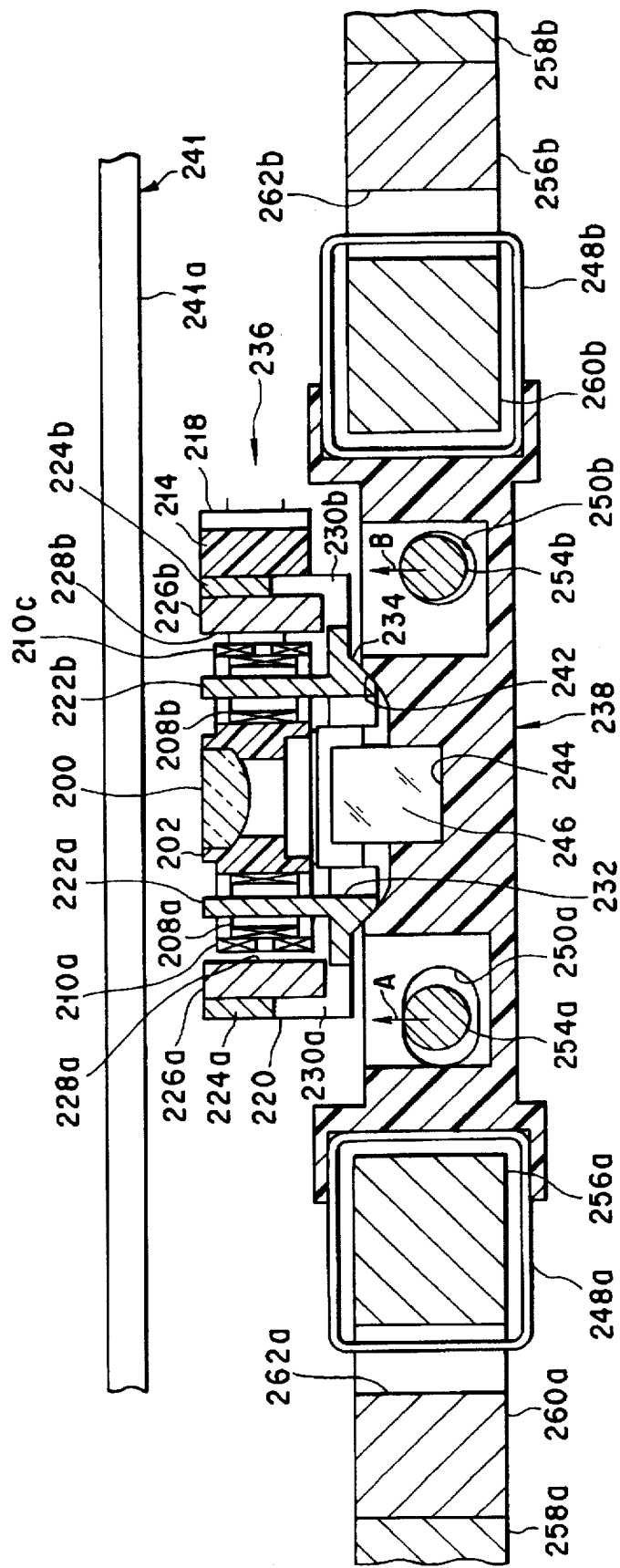
FIG. 24 is a schematic cross-sectional view showing the main part of the optical system driving apparatus in FIG. 22, together with a disk-like information recording medium arranged at a predetermined position in an optical information recording/reproducing apparatus using the optical system driving apparatus in FIG. 22.

Since the spherical surface slidable contact portion 234 on the lower surface of the base member 220 is in slidable contact with the spherical surface slidable contact portion 242 of the recess portion 240 of the carriage 238, the base member 220 can be freely inclined on the recess portion 240 of the carriage 238. As a result, in a production line of an optical information recording/reproducing apparatus using the optical system driving apparatus of this embodiment, the optical axis of the objective lens 200 of the objective lens focus adjustment member 202 can be finely adjusted to be perpendicular to an information recording surface 241a, of an optical disk 241 as a known disk-like information recording medium, which faces downward along the direction indicated by the arrow Z2. In this case, as shown in FIG. 24, the optical disk 241 is detachably mounted at a predetermined position located within the X-Y plane above the objective lens focus adjustment member 202 in the optical information recording/reproducing apparatus.

After this fine adjustment is completed, the spherical surface slidable contact portion 234 on the lower surface of the base member 220 and the spherical sliding contact portion 242 of the recess 240 of the carriage 238 are fixed each other by a known fixing means such as a set screw or an adhesive.

As shown in FIG. 23, a light beam introduction groove 244 is formed in the upper surface of the carriage 238, which faces in the direction indicated by the arrow Z1. The light beam introduction groove 244 extends from a center of the recess portion 240 in the direction indicated by the arrow X2. A prism 246 is arranged in the light beam introduction groove 244 at the center of the recess portion 240 of the upper surface of the carriage 238. The prism 246 designed to direct a light beam from a known light beam emitting/receiving means (not shown) such as a laser beam emitting means or receiving means arranged on a base deck (not shown) of the optical information recording/reproducing apparatus and located at a position separated from the carriage 238 in the direction indicated by the arrow X2, toward the information recording surface 241a of the optical disk 241 through the objective lens 200 of the objective lens focus adjustment member 202 and also direct a light beam reflected form the optical disk 241 through the objective lens 200 toward the known light beam emitting/receiving means (not shown).

As best shown in FIG. 23, access coils 248a and 248b are fixed to two side surfaces of the carriage 238, which face in the directions indicated by the arrows Y1 and Y2, with the central openings of the coils respectively facing in the directions indicated by the arrows X1 and X2. These access coils 248a and 248b are electrically connected to an electric circuit (not shown) of the optical information recording/reproducing apparatus via a flexible wiring board (not shown).

A pair of sliding bearings holes 250a and 250b extending in the tracking direction indicated by the arrows X1 and X2 are formed between the recess portion 240 of the upper surface of the carriage 238 and two side surfaces respectively facing in the directions indicated by the arrows Y1 and Y2. Note that the sliding bearing hole 250a located in the direction indicated by the arrow Y1 has a circular cross-section, and another sliding bearing hole 250b located in the direction indicated by the arrow Y2 has a substantially elliptic cross-section elongated in the directions indicated by the arrows Y1 and Y2. The substantially elliptic cross-section has a pair of parallel portions extending in the directions indicated by the arrows X1 and X2 to be parallel to each other and facing each other in the directions indicated by the arrows Z1 and Z2, and the distance between the pair of parallel portions is substantially equal to the diameter of the sliding bearing hole 250a having the circular cross-section.

Each of the pair of sliding bearings holes 250a and 250b in the carriage 238 is divided into two portions at an intermediate portion between two end surfaces (facing in the tracking directions indicated by the arrows X1 and X2) of the carriage 238, by a corresponding one of through holes 252a and 252b extending between the upper and lower surfaces of the carriage 238, which respectively face upward and downward along the directions indicated by the arrows Z1 and Z2.

The through holes 252a and 252b contribute to a reduction in weight of the carriage 238.

The pair of sliding bearings holes 250a and 250b are not formed by fixing independent sliding bearings to the carriage 238 but are integrally formed by using the same material as that for the carriage 238 when the carriage 238 of a synthetic resin is formed.

As a material for the carriage 238, a material having good sliding characteristics is selected.

As shown in FIG. 22, a pair of guide rails 254a and 254b are respectively inserted in the pair of sliding bearings holes 250a and 250b in the carriage 238 to extend in the tracking directions indicated by the arrows X1 and X2 to be parallel to each other. Each of the pair of guide rails 254a and 254b is constituted by a magnetic member. Surfaces of the pair of guide rails 254a and 254b are coated with an ethylene tetrafluoride resin to reduce frictional force produced between the guide rails 254a and 254b and the pair of sliding bearings holes 250a and 250b when the carriage 238 slides on the guide rails 254a, 254b. As shown in FIG. 24, in the through holes 252a and 252b in the carriage 238, the pair of guide rails 254a and 254b are located below the first and second outer yokes 224a and 224b of the base member 220 seated on the carriage 238.

The diameter of each of the pair of guide rails 254a and 254b is set to be slightly smaller than both the diameter of one sliding bearing hole 250a having the circular cross-section and the distance between the pair of parallel portions (in the directions indicated by the arrows Z1 and Z2) of the other siding bearing hole 250b having the elliptic cross-section, thereby allowing smooth slidable contact of the pair of sliding bearing holes 250a and 250b to the guide rails 254a, 254b. The size of the other sliding bearing hole 250 having the elliptic cross-section in the directions indicated by the arrows Y1 and Y2 is set to be larger than the diameter of the corresponding guide rail 254b so as to adjust a manufacturing dimensional tolerance in the distance between the pair of guide rails 254a and 254b.

As shown in FIG. 22, third and fourth inner yokes 256a and 256b extending in the tracking directions indicated by the arrows X1 and X2 extend through the two access coils 248a and 248b, respectively. Each of the third and fourth inner yokes 256a and 256b has a substantially rectangular cross-section and is constituted by a magnetic member.

Third and fourth outer yokes 258a and 258b are respectively arranged at outsides of the third and fourth inner yokes 256a and 256b in the directions indicated by the arrows Y1 and Y2 to be separated from the third and fourth inner yokes 256a and 256b by predetermined distances, respectively, and to extend in the same directions as the extending directions of the third and fourth inner yokes 256a and 256b. End portions of the third and fourth outer yokes 258a and 258b in the directions indicated by the arrows X1 and X2 are bent toward the third and fourth inner yokes 256a and 256b, respectively, and are fixed to outer surfaces of the third and fourth inner yokes 256a and 256b, facing in the directions indicated by the arrows Y1 and Y2. Third and fourth elongated magnets 260a and 260b extending along the longitudinal directions of the third and fourth outer yokes 258a and 258b are respectively arranged in the gaps between the third and fourth outer yokes 258a and 258b and the third and fourth inner yokes 256a and 256b. The third and fourth magnets 260a and 260b are respectively fixed to inner surfaces of the third and fourth outer yokes 258a and 258b, and predetermined magnetic gaps 262a and 262b are produced between the third and fourth magnets 260a and 260b and the corresponding third and fourth inner yokes 256a and 256b.

Outer walls of the two access coils 248a and 248b in the directions indicated by the arrows Y2 and Y1 are located in the magnetic gaps 262a and 262b. With this structure, magnetic forces from the third and fourth magnets 260a and 260b act on the two access coils 248a and 248b.

The two access coils 248a and 248b, the third and fourth magnets 260a and 260b, the third and fourth inner yokes 256a and 256b, and the third and fourth outer yokes 258a and 258b constitute a magnetic driving means for moving the carriage 238 in a desired tracking direction along the pair of guide rails 254a and 254b at a desired speed by controlling currents supplied to the two access coils 248a and 248b through the above electrical control means (not shown) of the optical information recording/reproducing apparatus, to which the two access coils 248a and 248b are electrically connected via the flexible wiring board (not shown).

Two end portions of each of the pair of guide rails 254a and 254b in the tracking directions indicated by the arrows X1 and X2, the third and fourth inner yokes 256a and 256b, and the third and fourth outer yokes 258a and 258b are fixed to the base deck (not shown) of the optical information recording/reproducing apparatus.

An operation of the optical system driving apparatus of this embodiment having the above arrangement will be described next.

FIG. 25 shows a state wherein one guide rail 254a located below (indicated by the arrow Z2) the first magnet 226a is arranged in a magnetic field generated by the first magnet 226a located in the direction indicated by the arrow Y2, and the magnetic field is acting on the guide rail 254a.

Direction of the magnetic flux in the magnetic field acting on the guide rail 254a is upper left (an intermediate direction between the directions respectively indicated by the arrows Z1 and Y2). Consequently, an urging force acts on the guide rail 254a in a direction toward the first magnet 226a.

In contrast to this, as shown in FIG. 24, a magnetic field generated by the second magnet 226b, located in the direction indicated by the arrow Y1, and acting on the other guide rail 254b located below (indicated by the arrow Z2) the second magnet 226b produces on urging force to urge the other guide rail 254b toward the second magnet 226b.

Therefore, a horizontal component force (in the direction indicated by the arrow Y2) of the urging force generated by the magnetic flux in the magnetic field generated by the first magnet 226a and acting on one guide rail 254a cancels a horizontal component force (in the direction indicated by the arrow Y1) of the urging force generated by the magnetic flux in the magnetic field generated by the second magnet 226b and acting on the other guide rail 254b. As a result, the first and second magnets 226a and 226b apply urging forces to the pair of guide rails 254a and 254b in substantially only in the directions indicated by arrows A and B in. FIG. 24.

With these urging forces, the optical element holding unit 236 including the base member 220 to which the first and second magnets 226a and 226b are fixed, and the carriage 238 supporting the optical element holding unit 236 are pressed downward against the pair of guide rails 254a and 254b along the direction indicated by the arrow Z2.

The above urging forces act in cooperation with total weight of the optical element holding unit 236 and the carriage 238 supporting the optical element holding unit 236. As a result, the carriage 238 produces no rattling on the pair of guide rails 254a and 254b even if vibrations are externally applied to the optical information recording/reproducing apparatus using the optical system driving apparatus of this embodiment, or something comes into contact with the optical system driving apparatus while the driving apparatus is sliding along the pair of guide rails 254a and 254b, in spite of the above-mentioned small gaps between the pair of sliding bearings holes 250a and 250b and the pair of guide rails 254a and 254b.

The openings 230a and 230b, which are formed in the proximal ends of the first and second outer yokes 224a and 224b fixed to the first and second magnets 226a and 226b to extend into the base member 220, serve to increase the magnetic flux densities of magnetic forces generated by the first and second magnets 226a and 226b and acting on the pair of guide rails 254a and 254b exposed in the through holes 252a and 252b in the carriage 238, thereby improving the stability of the sliding characteristics of the carriage 238 on the pair of guide rails 254a and 254b.

Note that the slidable coupling mechanism arranged between the optical element holding unit 236 and the carriage 238 of the base member 220 and designed for fine adjustment of the inclination of the optical axis of the objective lens 200 of the optical element holding unit 236 in the fourth embodiment can be replaced with the slidable coupling mechanism arranged between the base member 106a of the optical element holding unit or the base block 171 and the carriage 102 or 160 and designed for fine adjustment of the inclination of the optical axis of the objective lens 104 or 166 of the optical element holding unit in the first, second, or third embodiment.

In contrast to this, the sliding movement stabilizing mechanism of the carriage 238 with respect to the pair of guide rails 254a and 254b, which uses a magnetic force from the magnetic driving means for moving the objective lens 200 of the optical element holding unit 236 by small distances in the tracking directions indicated by the arrows X1 and X2 and the focusing directions indicated by the arrows Z1 and Z2 in the fourth embodiment can be replaced with the sliding movement stabilizing mechanism designed for the same purpose in each of the first to third embodiments.

[Fifth Embodiment]

Figure 26:
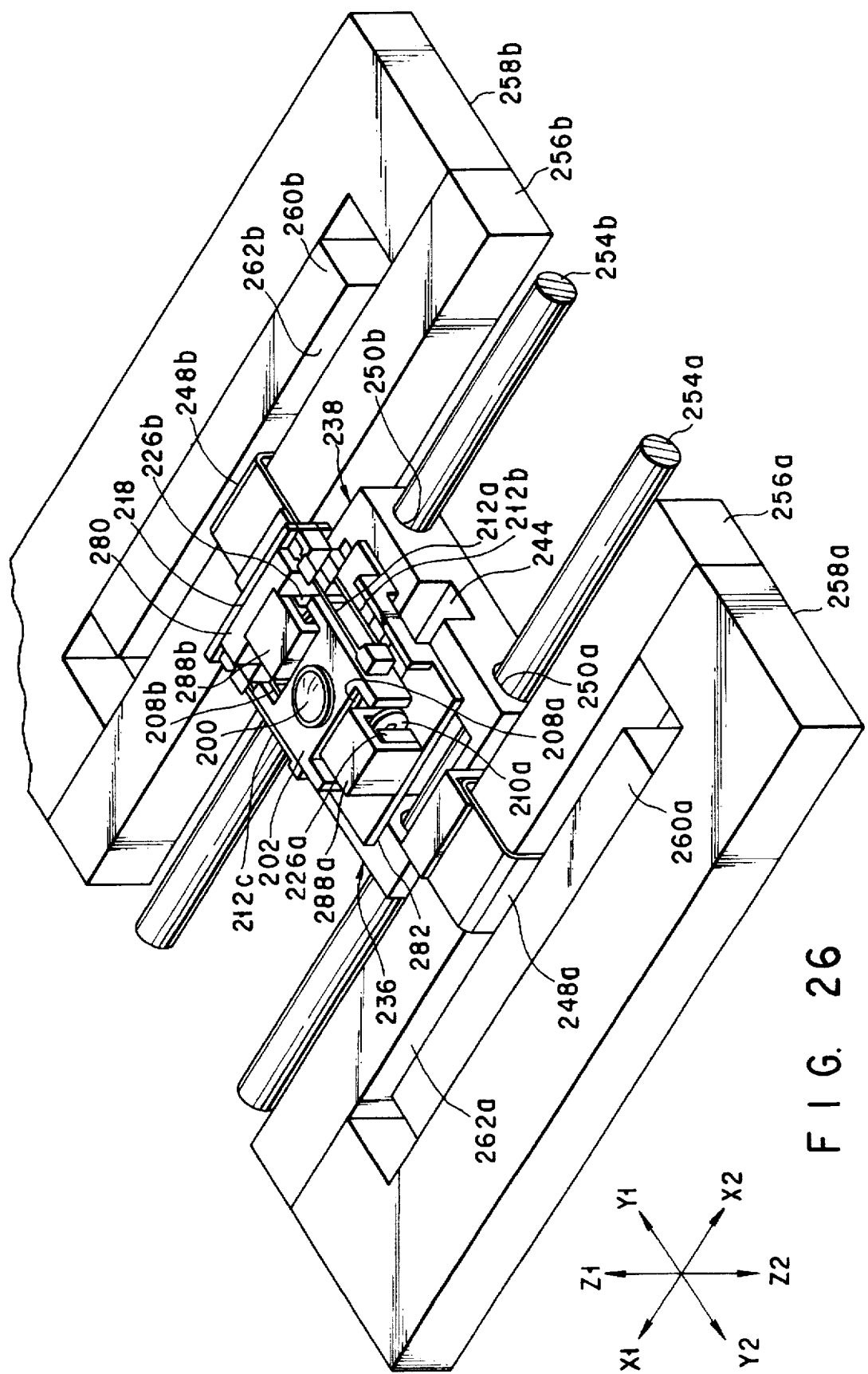
FIG. 26 is a schematic perspective view showing a main part of a fifth embodiment of the optical system driving apparatus of the present invention, when viewed downward obliquely.

A fifth embodiment of the optical system driving apparatus of the present invention will be described in detail next with reference to FIGS. 26 to 28. An arrangement of the fifth embodiment is almost the same as that of the fourth embodiment. Therefore, in FIGS. 26 to 28, the same reference numerals as those used in the fourth embodiment denote the same parts as in the fourth embodiment, and a detailed description thereof will be omitted.

In this embodiment, constructions of a spring bearing member 280, a base member 282, first inner and outer yokes 284a and 286a, and second inner and outer yokes 284b and 286b in an optical element holding unit 236 is different from the constructions of the spring bearing member 214, the base member 220, the first inner and outer yokes 222a and 224a, and the second inner and outer yokes 222b and 224b in the optical element holding unit 236 in the fourth embodiment.

In the fourth embodiment, the first inner and outer yokes 222a and 224a and the second inner and outer yokes 222b and 224b are integrally formed with the base member 220. However, in the fifth embodiment, the first inner and outer yokes 284a and 286a and the second inner and outer yokes 284b and 286b are formed as different members independent of the base member 282.

Figure 27:
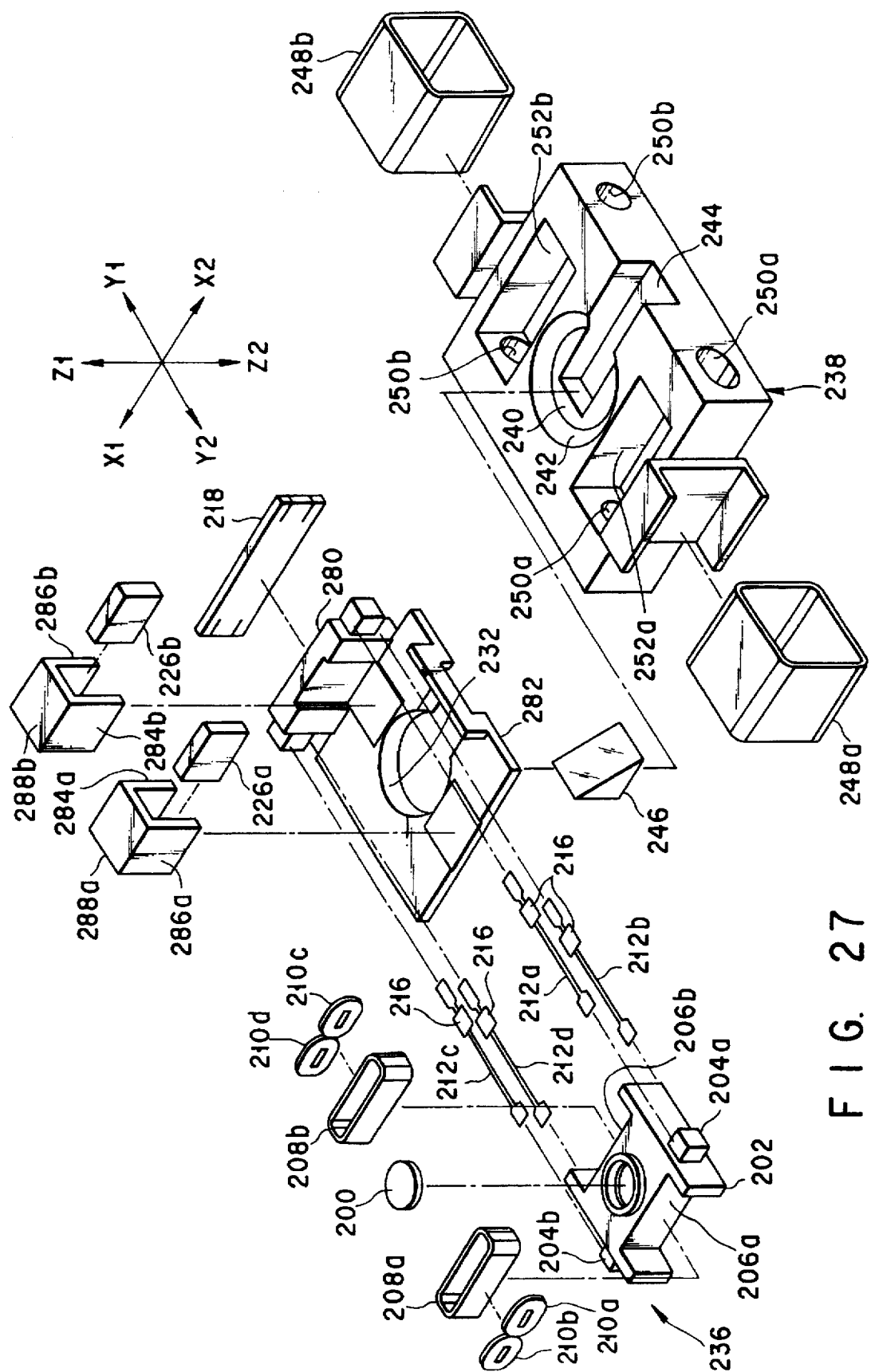
FIG. 27 is a schematic exploded perspective view showing an optical element holding unit and a carriage supporting the unit, which constitute the main part of the optical system driving apparatus in FIG. 26, when viewed downward obliquely.

As clearly shown in FIG. 27, upper end portions (in a direction indicated by an arrow Z1) of the first inner and outer yokes 284a and 286a are coupled to each other via a bridge-like wall extending on the X–Y plane, thus constituting a first yoke unit 288a. Similarly, upper end portions (in the direction indicated by the arrow Z1) of the second inner and outer yokes 284b and 286b are coupled to each other via a bridge-like wall extending on the X–Y plane, thus constituting a second yoke unit 288b.

Lower end portions (in a direction indicated by an arrow Z2) of the first inner and outer yokes 284a and 286a of the first yoke unit 288a and of the second inner and outer yokes 284b and 286b of the second yoke unit 288b are fixed by a known fixing means such as an adhesive, to two end portions (in directions indicated by arrows Y1 and Y2) on an upper surface of the base member 282 which face upward along the direction indicated by the arrow Z1.

Similar to the fourth embodiment described above, a pair of guide rails 254a and 254b are located almost below the first and second outer yokes 286a and 286b to which first and second magnets 226a and 226b are fixed, as clearly shown in FIG. 28.

The base member 220 in the fourth embodiment is made of a magnetic material. However, the base member 282 in the fifth embodiment is made of a synthetic resin.

Furthermore, the spring bearing member 214 is independent of the base member 220 in the fourth embodiment. However, in the fifth embodiment, the spring bearing member 280 is integrally formed with the base member 282 by using a synthetic resin.

An operation of this embodiment having the above arrangement will be described below.

Figure 28:
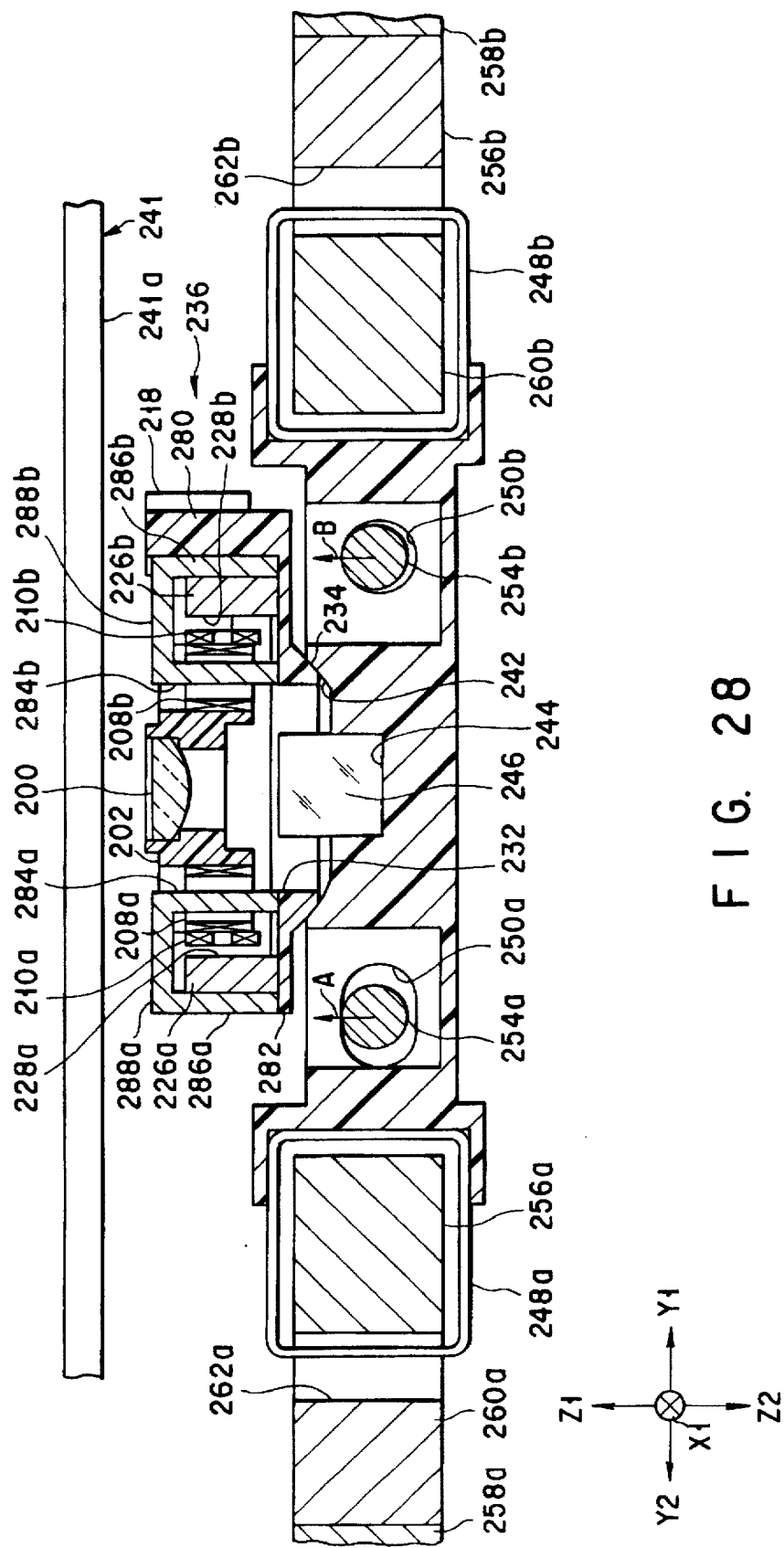
FIG. 28 is a schematic cross-sectional view showing the main part of the optical system driving apparatus in FIG. 26, together with a disk-like information recording medium arranged at a predetermined position in an optical information recording/reproducing apparatus using the optical system driving apparatus in FIG. 26.

Magnetic fluxes leaking from the first and second magnetic circuits respectively constituted by the first yoke unit 288a having the first magnet 226a and the second yoke unit 288b having the second magnet 226b act on the magnetic guide rails 254a and 254b respectively arranged below the first and second magnetic circuits, as shown in FIG. 28. In this case, free ends of the first and second yoke units 288a and 288b respectively face the guide rails 254a and 254b. Furthermore, the base member 282 is made of a synthetic resin. Therefore, magnetic fluxes leaking from the first and second magnetic circuits reach the guide rails 254a and 254b in large amounts. For this reason, urging forces based on the magnetic forces generated by the first and second magnetic circuits, by which the pair of guide rails 254a and 254b are attracted to the first and second magnetic circuits, as indicated by arrows A and B, (i.e., forces which press a carriage 238, which supports the optical element holding unit 236 including the first and second magnetic circuits, against the pair of guide rails 254a and 254b downward along the direction indicated by the arrow Z2) are larger than the equivalent forces in the fourth embodiment.

An effect obtained by the above described urging forces in cooperation with the total weight of the optical element holding unit 236 and the carriage 238 supporting the optical element holding unit 236 is the same as that in the fourth embodiment described above. However, since the urging forces are larger than the equivalent forces in the fourth embodiment as described above, the effect in the fifth embodiment is greater than that in the fourth embodiment.

According to this embodiment, the upper end portions of the first inner and outer yokes 284a and 286a in the direction indicated by the arrow Z1 are coupled to each other via the bridge-like wall, while the lower end portions of the yokes 284a and 286a in the direction indicated by the arrow Z2 are fixed to the carriage 238. In addition, the upper end portions of the second inner and outer yokes 284b and 286b in the direction indicated by the arrow Z1 are coupled to each other via the bridge-like wall, while the lower end portions of the yokes 284b and 286b in the direction indicated by the arrow Z2 are fixed to the carriage 238. Furthermore, no openings are formed in the first and second outer yokes 286a and 286b, unlike the first and second outer yokes 224a and 224b respectively having the openings 230a and 230b formed therein in the fourth embodiment.

With this structure, the first inner and outer yokes 284a and 286a and the second inner and outer yokes 284b and 286b are high in rigidity and hence are not easily resonated.

Since no openings are formed in the first and second outer yokes 286a and 286b, outer sizes of the first and second yoke units 288a and 288b including these yokes can be reduced. As a result of this, outer size and weight of the optical system driving apparatus can be reduced.

The bridge-like walls, which respectively couple the upper end portions (in the direction indicated by the arrow Z1) of the first inner and outer yokes 284a and 286a to each other and the upper end portions (in the direction indicated by the arrow Z1) of the second inner and outer yokes 284b and 286b to each other, reduce the amounts of magnetic fluxes leaking from the first and second yoke units 288a and 288b upward along the direction indicated by the arrow Z1. Consequently, as is apparent from FIG. 28, these bridge-like walls can reduce influences of magnetic fields leaking from the first and second yoke units 288a and 288b, to a disk-like information recording medium 241 arranged at a position separated upward from the first and second yoke units 288a and 288b by a predetermined distance in the direction indicated by the arrow Z1. This structure is especially advantageous if the disk-like information recording medium 241 is a magneto-optic disk. That is, this structure allows better recording/reproduction of information on/from the information recording medium 241.

In addition, in this embodiment, since the base member 282 is made of a synthetic resin, weight of the base member 282 is reduced.

Note that a slidable coupling mechanism arranged between the optical element holding unit 236 and the carriage 238 of the base member 282 and designed for fine adjustment of the inclination of the optical axis of an objective lens 200 of the optical element holding unit 236 in the fifth embodiment can be replaced with the slidable coupling mechanism arranged between the base member 106a of the optical element holding unit or the base block 171 and the carriage 102 or 160 and designed for fine adjustment of the inclination of the optical axis of the objective lens 104 or 166 of the optical element holding unit in the first, second, or third embodiment.

In contrast to this, the sliding movement stabilizing mechanism of the carriage 238 with respect to the pair of guide rails 254a and 254b, which uses a magnetic force from the magnetic driving means for moving the objective lens 200 of the optical element holding unit 236 by small distances in the tracking directions indicated by the arrows X1 and X2 and the focusing directions indicated by the arrows Z1 and Z2 in the fifth embodiment can be replaced with the sliding movement stabilizing mechanism designed for the same purpose in each of the first to third embodiments.

[Modification]

A modification of the second embodiment (shown in FIGS. 16 to 18) of the optical system driving apparatus of this invention will be described in detail with reference to FIGS. 29 and 30. An arrangement of this modification is almost the same as that of the second embodiment. Therefore, in FIGS. 29 and 30, the same reference numerals used as those used in the second embodiment denote the same part as in the second embodiment, and a detailed description thereof will be omitted.

Figure 29:
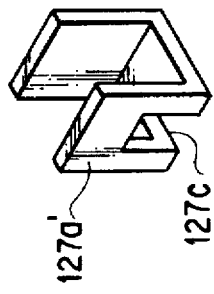
FIG. 29 is a schematic perspective view showing a modification of a yoke with a magnet of magnetic force driving means, the magnetic force driving means being used in the second embodiment of the optical system driving apparatus of the invention in FIGS. 16 to 18, for driving an objective lens focus adjustment member of the optical element holding unit.

FIG. 29 shows a perspective view of a yoke 127a' a construction of which is different from that of the yoke 127a of the second embodiment. The yoke 127a is a part of magnetic driving means for driving an objective lens focus adjustment member 106b with magnetic force generated from the magnetic driving means, and is so different from the yoke 127a of the second embodiment that the yoke 127a' of the embodiment is provided with an opening 127c extending from a proximal end portion of an outer yoke region of the yoke 127a' into a base connecting a proximal end of the outer yoke region and a proximal end of an inner yoke region of the yoke 127a.

Figure 30:
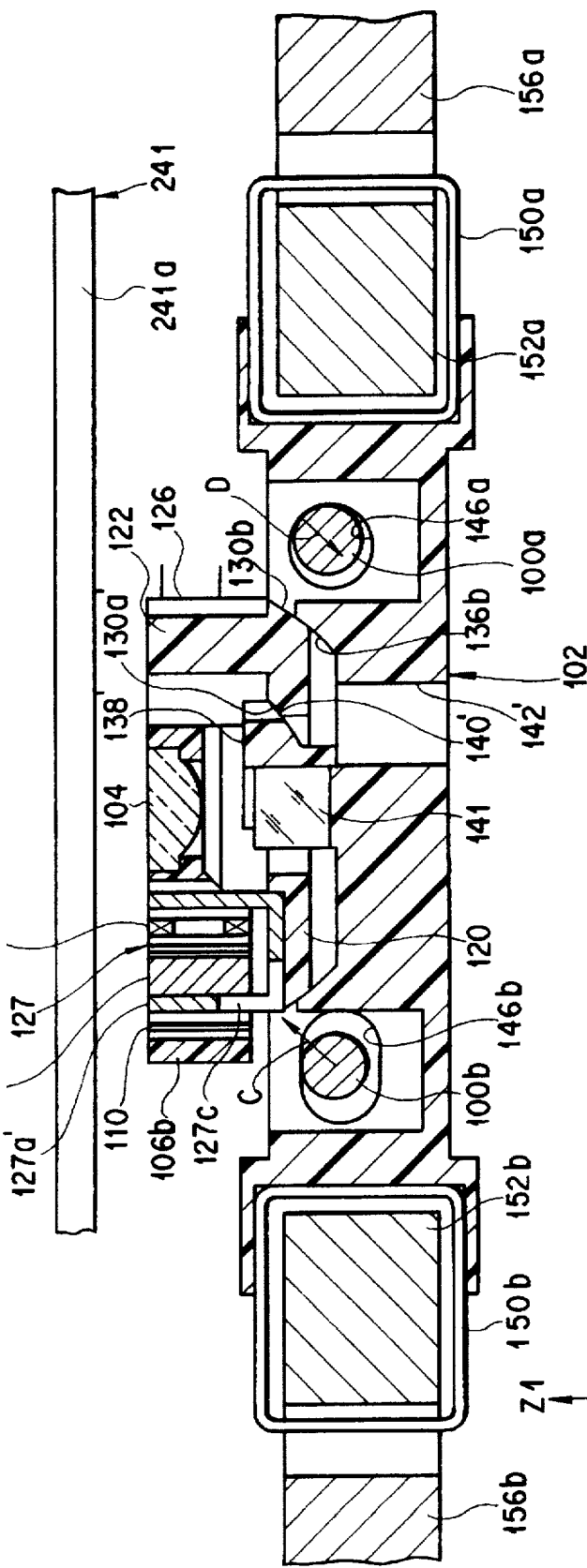
FIG. 30 is a schematic cross sectional view of the second embodiment of the optical system driving apparatus of this invention shown in FIGS. 16 to 18, the second embodiment being provided with the modification of the yoke with a magnet of the magnetic force driving means in FIG. 29.

FIG. 30 shows a cross sectional view of the second embodiment of the optical system driving apparatus of this invention, which is shown in FIGS. 16 to 18 and to which the yoke 127a' of the modification in FIG. 29 is applied. As apparent from this cross section, the opening 127c of the yoke 127a' makes a guide rail 100b of a magnetic material, which is exposed in one through hole 148b of a carriage 102 and corresponds to the above described magnetic driving means of an optical element holding unit 106, directly oppose to a magnet 127b arranged in a center recess of the yoke 127a'.

As a result of this, magnetic force generated from the magnet 127b operates more strongly to the guide rail 100b, as compared to the case in FIG. 16 in which the outer yoke region is interposed between the magnet 127b and the guide rail 100b'.

That is, as shown by an arrow C in FIG. 30, attractive force of the magnet 127b which attracts the guide rail 100b is increased, and this means that, as is shown in FIG. 30 by an arrow C, force preying the carriage 102 on which the optical element holding unit 106 with the magnet 127b is mounted, against the pair of guide rails 100a, 100b is increased as compared with that force of the second embodiment of the optical system driving apparatus of this invention, shown in FIGS. 16 to 18.

Therefore, the carriage 102 can slide more stably on the pair of guide rails 100a, 100b without ratting thereon.

[Another Modification]

Next, modification of the third embodiment (shown in FIGS. 19 to 21) of the optical system driving apparatus of this invention will be described in detail with reference to FIGS. 31 and 32. An arrangement of this modification is almost the same as that of the third embodiment. Therefore, the same reference numerals used as those used in the third embodiment denote the same parts as in the third embodiment, and a detailed description thereof will be omitted.

Figure 32:
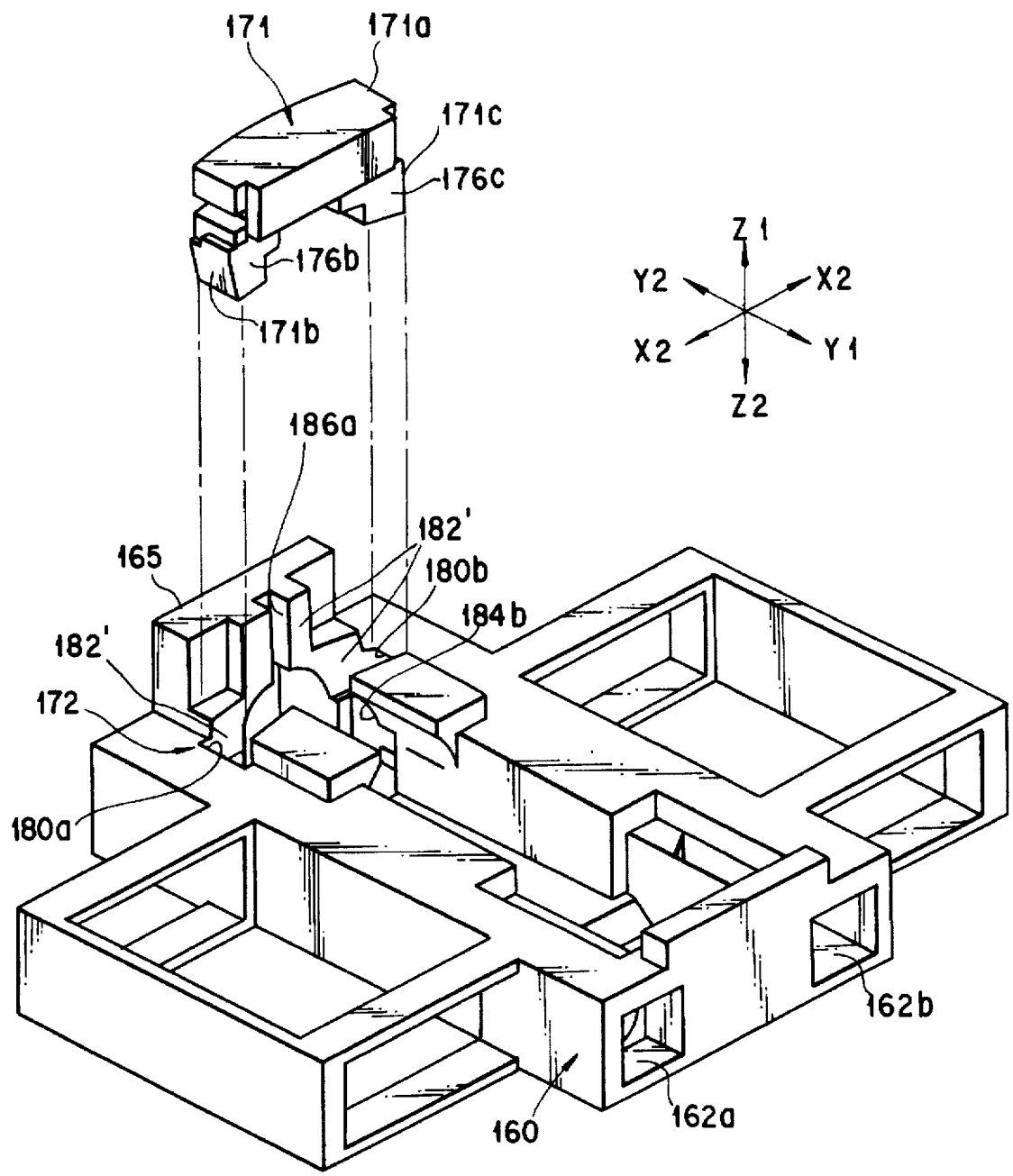
FIG. 32 is a schematic exploded perspective view of the base block of the optical element holding unit of the main portion of the modification of the optical system driving apparatus of FIG. 31, and the carriage supporting the block, when viewed from an oblique upper rear side of the main part.

FIG. 31 is a schematic exploded perspective view showing a base block of an optical element holding unit of a main portion of a modification of the third embodiment (shown in FIGS. 19 to 21) of the optical system driving apparatus of this invention, and a carriage supporting the base block, when viewed from obliquely upper front side of the apparatus; and FIG. 32 is a schematic exploded perspective view of the base block of the optical element holding unit of the main portion of the optical system driving apparatus in FIG. 31, and the carriage supporting the base block when viewed from obliquely upper rear side of the apparatus.

In this modification, as shown in FIG. 31, all of surface regions on a base body 171a and a pair of leg portions 171b, 171c in a base block 171 of the optical element holding unit, the surface regions facing in a direction indicated by an arrow X2, are constructed as a second sliding contact surface portion 174' by one spherical surface having a center coinciding with a center of an objective lens 162 supported by an objective lens focus adjustment member 168 of the optical element holding unit.

Further, as shown in FIG. 32, all surface regions on a bridge portion 165 and on a pair of fitting recesses 180a, 180b of a base block sliding portion 172 in a carriage 160, the surface regions corresponding to the second sliding surface portion 174' of the base block 171 and facing in a direction indicated by an arrow X1, are constructed as a second sliding contact surface portion 182 by one spherical surface having a center coinciding with the center of the objective lens 167 supported by the objective lens focus adjustment member 168 of the optical element holding unit.

The radius of the above described one spherical surface of the second sliding contact surface portion 174' of the base block 171 is substantially the same as that of the above described one spherical surface of the second sliding contact surface portion 182' of the base block sliding portion 172 of the carriage 160.

Operation of the base block 171 of this modification and technical advantages resulting from the base block 171 are the same as those of the third embodiment of the optical system driving apparatus of this invention, described above with reference to FIGS. 19 to 21.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical system driving apparatus comprising:

an optical element holding member holding an optical element and having first and second surfaces facing in opposite directions; and a carriage having first and second surfaces which are in contact with the first and second surfaces of the optical element holding member and which slidably clamp the first and second surfaces of the optical element holding member so as to hold the optical element holding member with a frictional force generated between the first and second surfaces of the holding member and the first and second surfaces of the carriage, said optical element holding member being movable relative to said carriage against said frictional force;

wherein:

at least one of a slidable contact surface portion of the first surface of the optical element holding member which corresponds to the first surface of the carriage, and a slidable contact surface portion of the first surface of the carriage which corresponds to the first surface of the optical element holding member, is formed into an at least partly spherical shape having a center coinciding with an optical center of the optical element, the other of the slidable contact surface portions of the first surfaces of the optical element holding member and the carriage is arranged to guide the optical element holding member to move in a circumferential direction of the at least partly spherical shaped slidable contact surface portion, at least one of a slidable contact surface portion of the second surface of the optical element holding member which corresponds to the second surface of the carriage, and a slidable contact surface portion of the second surface of the carriage which corresponds to the second surface of the optical element holding member, is formed into an at least partly spherical shape having a center coinciding with the optical center of the optical element, and the other of the slidable contact surface portions of the second surfaces of the optical element holding member and the carriage is arranged to guide the optical element holding member to move in a circumferential direction of the at least partly spherical shaped slidable contact surface portion.

2. An optical system driving apparatus according to claim 1, wherein:

the optical element holding member has a light passage hole which has a center coinciding with an optical axis of the optical element, and which extends through the optical element holding member along the optical axis from the first surface to the second surface, the carriage has at least one engaging projection which protrudes from the second surface of the carriage, which is inserted into the light passage hole so that the at least one engaging projection is arranged around the optical axis, which extends out from the first surface of the optical element holding member, and which has an engaging surface which is externally engaged with the slidable contact surface portion of the first surface of the optical element holding member, and the slidable contact surface portion of the first surface of the carriage comprises the engaging surface of the at least one engaging projection engaged with the slidable contact surface portion of the first surface of the optical element holding member.

3. An optical system driving apparatus according to claim 2, wherein:

the light passage hole has an elongated cross-section with two substantially parallel long sides, the slidable contact surface portion of the first surface of the optical element holding member is formed along the two long sides of the cross-section of the light passage hole, the carriage has another engaging projection arranged at a position symmetrical to the at least one engaging projection relative to the optical axis, and a distance between two surface portions of the two engaging projections, wherein the two surface portions face in opposite directions and more spaced apart from each other than the remaining portions of the two projections, is set to be greater than a distance between the two long sides of the cross-section of the light passage hole and to be smaller than a distance between two ends of the cross-section of the light passage hole in the longitudinal direction of the light passage hole.

4. An optical system driving apparatus according to claim 1, wherein:

the slidable contact surface portions of the first and second surfaces of the optical element holding member are formed only in one circumferential direction with respect to the optical axis of the optical element, and the slidable contact surface portions of the first and second surfaces of the carriage are also formed only in said one circumferential direction with respect to the optical axis of the optical element.

5. An optical system driving apparatus according to claim 4, wherein:

the optical element holding member comprises a block having two surfaces facing in opposite directions, said two surfaces of said block respectively comprise the first and second surfaces of the optical element holding member, the carriage has an opening in which the block is fitted, an inner surface of said opening of the carriage has two surface portions facing each other, and said two surface portions respectively comprise the first and second surfaces for slidably clamping the two surfaces of the block.

6. An optical system driving apparatus according to claim 5, wherein:
 a projection is formed in substantially a center of one of the two surfaces of the block, the one of the two surfaces being farther away than the other of the two surfaces from the optical axis of the optical element,
 a groove is formed in one of the two surface portions of the opening in the carriage, the one of the two surface portions being in contact with the one surface of the block which is located farther away from the optical axis of the optical element, the groove extending in the direction in which the block is detached from the opening, and the projection of the block being inserted in the groove, and
 when the two surfaces of the block are slid on the two corresponding surface portions of the opening, the projection of the block rotates about a center of the projection in the groove of the opening and/or moves in the extending direction of the groove in accordance with the sliding direction of the block.

7. An optical system driving apparatus comprising:
 a plurality of guide rails arranged to be parallel to each other and to extend in a same direction;
 a carriage movably supported by the plurality of guide rails and guided in a moving direction by the plurality of guide rails;
 an optical element holding member holding an optical element including an objective lens and supported by the carriage to be movable in a direction along an optical axis of the objective lens;
 first magnetic driving means, mounted on the carriage, for driving the optical element holding member to vary the position of the optical element holding member relative to the carriage with a magnetic force, and second magnetic driving means for driving the carriage along the axial direction of the guide rails with a magnetic force,
 wherein:
 at least one of the plurality of guide rails includes a magnetic member, and
 a magnetic force generated by the first magnetic driving means mounted on the carriage acts on at least said one of the guide rails to urge the carriage in a radial direction of a center line of each of the plurality of guide rails so as to press the carriage against the plurality of guide rails in the radial direction.

8. An optical system driving apparatus comprising:
 a plurality of guide rails arranged to be parallel to each other and to extend in a same direction;
 a carriage movably supported by the plurality of guide rails and guided in a moving direction by the plurality of guide rails;
 an optical element holding member holding an optical element including an objective lens and supported by the carriage to be movable in a direction along an optical axis of the objective lens;
 first magnetic driving means, mounted on the carriage, for driving the optical element holding member, and second magnetic driving means for driving the carriage with a magnetic force,
 wherein:
 at least one of the plurality of guide rails includes a magnetic member, and
 a magnetic force generated by the first magnetic driving means mounted on the carriage acts on at least said one of the guide rails to urge the carriage in a radial direction of a center line of each of the plurality of guide rails so as to press the carriage against the plurality of guide rails in the radial direction;
 the optical element holding member has first and second surfaces facing in opposite directions,
 the carriage has first and second surfaces which are in contact with the first and second surfaces of the optical element holding member and which slidably clamp the first and second surfaces of the optical element holding member so as to hold the optical element holding member to be movable with frictional force generated between the first and second surfaces of the holding member and the first and second surfaces of the carriage, said optical element holding member being movable relative to said carriage against said frictional force,
 at least one of a slidable contact surface portion of the first surface of the optical element holding member which corresponds to the first surface of the carriage, and a slidable contact surface portion of the first surface of the carriage which corresponds to the first surface of the optical element holding member, is formed into an at least partly spherical shape having a center coinciding with an optical center of the optical element,
 the other of the slidable contact surface portions of the first surfaces of the optical element holding member and the carriage is arranged to guide and move the optical element holding member in a circumferential direction of the at least partly spherical shaped slidable contact surface portion,
 at least one of a slidable contact surface portion of the second surface of the optical element holding member which corresponds to the second surface of the carriage, and a slidable contact surface portion of the second surface of the carriage which corresponds to the second surface of the optical element holding member, is formed into an at least partly spherical shape having a center coinciding with the optical center of the optical element, and
 the other of the slidable contact surface portions of the second surfaces of the holding member and the carriage is arranged to guide and move the optical element holding member in a circumferential direction of the at least partly spherical shaped slidable contact surface portion.

9. An optical system driving apparatus according to claim 8, wherein:
 the optical element holding member has a light passage hole which has a center coinciding with an optical axis of the optical element, and which extends through the optical element holding member along the optical axis from the first surface to the second surface,
 the carriage has at least one engaging projection which protrudes from the second surface of the carriage, which is inserted into the light passage hole so that the at least one engaging projection is arranged around the optical axis, which extends out from the first surface of the optical element holding member, and which has an engaging surface which is externally engaged with the slidable contact surface portion of the first surface of the optical element holding member, and the slidable contact surface portion of the first surface of the carriage comprises the engaging surface of the at least one engaging projection engaged with the slidable contact surface portion of the first surface of the optical element holding member.

10. An optical system driving apparatus according to claim 9, wherein:

the light passage hole has an elongated cross-section with two substantially parallel long sides, the slidable contact surface portion of the first surface of the optical element holding member is formed along the two long sides of the cross-section of the light passage hole, the carriage has another engaging projection arranged at a position symmetrical to the at least one engaging projection relative to the optical axis, and a distance between two surface portions of the two engaging projections, wherein the two surface portions face in opposite directions and more spaced apart from each other than the remaining portions of the two projections, is set to be greater than a distance between the two long sides of the cross-section of the light passage hole and to be smaller than a distance between two ends of the cross-section of the light passage hole in the longitudinal direction of the light passage hole.

11. An optical system driving apparatus according to claim 9, wherein:

the slidable contact surface portions of the first and second surfaces of the optical element holding member are formed only in one circumferential direction with respect to the optical axis of the optical element, and the slidable contact surface portions of the first and second surfaces of the carriage are also formed only in said one circumferential direction with respect to the optical axis of the optical element.

12. An optical system driving apparatus according to claim 11, wherein:

the optical element holding member comprises a block having two surfaces facing in opposite directions, said two surfaces of said block respectively comprise the first and second surfaces of the optical element holding member, the carriage has an opening in which the block is fitted, an inner surface of said opening of the carriage has two surface portions facing each other, and said two surface portions respectively comprise the first and second surfaces for slidably clamping the two surfaces of the block.

13. An optical system driving apparatus according to claim 12, wherein:

a projection is formed in substantially a center of one of the two surfaces of the block, the one of the two surfaces being farther away than the other of the two surfaces from the optical axis of the optical element, a groove is formed in one of the two surface portions of the opening in the carriage, the one of the two surface portions being in contact with the one surface of the block which is located farther away from the optical axis of the optical element, the groove extending in the direction in which the block is detached from the opening, and the projection of the block being inserted in the groove, and when the two surfaces of the block are slid on the two corresponding surface portions of the opening, the projection of the block rotates about a center of the projection in the groove of the opening and/or moves in the extending direction of the groove in accordance with the sliding direction of the block.

* * * * *